(12) United States Patent
Matsuki et al.

(10) Patent No.: US 6,492,000 B1
(45) Date of Patent: Dec. 10, 2002

(54) SKIN-CARRYING IN-MOLD EXPANDED MOLDED BODY MANUFACTURING METHOD, THE MOLDED BODY, AND MOLD USED FOR MANUFACTURING THE SAME

(75) Inventors: Kiyoshi Matsuki, Nishinomiya (JP); Yoriki Kakimoto, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/319,619

(22) PCT Filed: Feb. 9, 1998

(86) PCT No.: PCT/JP98/00536
§ 371 (c)(1),
(2), (4) Date: Jul. 27, 1999

(87) PCT Pub. No.: WO98/34770
PCT Pub. Date: Aug. 13, 1998

(30) Foreign Application Priority Data

Feb. 10, 1997 (JP) .............................................. 9-26812
May 8, 1997 (JP) .............................................. 9-118338

(51) Int. Cl.$^7$ .............................. B29C 44/06; B32B 3/04
(52) U.S. Cl. ...................... 428/124; 156/227; 264/45.4; 264/46.6; 264/46.8; 264/296; 428/304.4; 428/318.4; 428/318.6
(58) Field of Search ................................. 264/295, 296, 264/46.6, 46.8, 45.4; 428/124, 126, 304.4, 318.4, 318.6; 156/227

(56) References Cited

U.S. PATENT DOCUMENTS

| | | | |
|---|---|---|---|
| 3,696,771 A | * | 10/1972 | Ambrose ..................... 428/126 |
| 4,709,523 A | * | 12/1987 | Broderick et al. ........... 428/124 |
| 4,925,718 A | * | 5/1990 | Tsujimoto et al. ........... 428/124 |
| 4,978,407 A | * | 12/1990 | Ardissone .................... 428/124 |
| 5,154,872 A | * | 10/1992 | Masui et al. ................. 264/295 |
| 5,349,796 A | * | 9/1994 | Meyerson ................. 52/309.11 |
| 5,352,397 A | * | 10/1994 | Hara et al. ................... 264/259 |
| 5,391,337 A | * | 2/1995 | Kearney et al. ............... 264/51 |
| 5,476,618 A | * | 12/1995 | Ito et al. ..................... 264/45.4 |
| 5,486,329 A | * | 1/1996 | Ueki et al. ................... 264/273 |
| 5,616,396 A | * | 4/1997 | Ueki et al. ................... 264/274 |
| 5,925,207 A | * | 7/1999 | Itoh et al. .................... 156/216 |
| 6,033,770 A | * | 3/2000 | Matsuki et al. ............ 428/309.9 |

FOREIGN PATENT DOCUMENTS

| | | | | |
|---|---|---|---|---|
| GB | 1 595 032 | * | 8/1981 | ................. 428/124 |
| JP | SHO62-78424 | | 5/1987 | |
| JP | 62108039 | | 5/1987 | |

* cited by examiner

Primary Examiner—Allan R. Kuhns
(74) Attorney, Agent, or Firm—Wolf, Greenfield & Sacks, PC

(57) ABSTRACT

In a simultaneous molding to one piece, at a time of heat molding of a surface skin material 3, after an edge part of the surface skin material 3 is folded back to an inside direction of the mold pattern and is formed up a folded back part 7 along a mold pattern for folding back 6 which is placed as in a manner of projecting from an opening edge 2b of a cavity face 2a toward the inside direction of the mold pattern, the mold pattern for folding back 6 is removed, and then at a time of the expansion molding, one face 7a of the folded back part 7 is melt united to one piece with a back face 5b of the cellular molded article in a mold pattern 5, and at the same time, a folded returning part 8, which is in a state that an outer edge part of the surface skin material 3 is folded returning toward an outside direction of the mold pattern from a tip 7c of this folded back part 7, is pressed so as to pile on the other face 7b of the above-mentioned folded back part 7.

34 Claims, 19 Drawing Sheets

SKIN-CARRYING IN-MOLD EXPANDED MOLDED BODY MANUFACTURING METHOD, THE MOLDED BODY, AND MOLD USED FOR MANUFACTURING THE SAME

TECHNICAL FIELD

This invention relates to a method for producing a cellular molded article having a surface skin in a mold pattern which is used, for example, as an automobile interior trim material or the like and an article thereof

BACKGROUND OF THE INVENTION

As for the conventional technique of this kind, for example, (a) so-called simultaneous molding with a surface skin in once (simultaneous one piece molding) is known as disclosed in TOKUKAI-SHO 62-108039. In this method, as illustrated in FIG. 26, a male-female coupled mold pattern 2 is used, and after a surface skin material 3 is preformed by vacuum-forming along a cavity surface 2a of female pattern 9, an expansion molding is performed in a cavity (inside of the mold pattern) 4 which is shaped up by a male pattern 10 combining with a surface skin material 3, at the same time, a cellular molded article (a cellular molded article in a mold pattern) 5 is united with the above-mentioned surface skin material 3 simultaneously. In this simultaneous molding, when the above-mentioned surface skin material 3 is vacuum formed, the outer edge part of said surface skin material 3 is fold-back formed as well from opening edge 2b toward an inside direction of the mold pattern along a folded back pattern (pattern for folding back) 6 which projects from opening edge 2b of the above-mentioned cavity face 2a toward the inside direction of the mold pattern in advance, and when the above-mentioned expansion molding is performed, a folded back part 7 of surface skin material 3 is united into one piece with back face 5b of the above-mentioned expanded molded article (the expanded molded article in the mold pattern) 5.

In this method, at a time of the above-mentioned vacuum forming, the outer edge part of the surface skin material 3 is formed in advance as folded back from tip 7c of the folded back part 7 toward outside direction of the mold pattern in a manner of rolling up folding pattern (pattern for folding back) 6, an expansion molding is performed with this state. And, after obtained a cellular molded article having a surface skin material (a cellular molded article having a surface skin in a mold pattern) 71a is removed from the pattern, unnecessary outer edge part of the surface skin material 3 is trimmed off at tip 7c of the above-mentioned folded back part 7.

(b) On the other hand, it is known that, in a cellular molded article having a surface skin in a mold pattern with a surface skin in which an insert member is melt united with outer edge part of back face 5b of cellular molded article 5, when the outer edge part of surface skin material 3 is folded back to back face 5b side of cellular molded article in a mold pattern 5, a prescribed range of the outer edge part of surface skin material 3 is cut off so as to avert the above-mentioned insert member, thereafter, it is necessary a process of folded back part 7 to be adhered to back face 5b of cellular molded article in a mold pattern 5.

(c) Furthermore, in a simultaneous one piece molding as in the above, a chamber connected with steam valve, decompression valve or the like is equipped in each of the 2 metal mold parts. And one metal mold part of them on which a surface skin material will be placed is formed to have a plural of decompressing holes and the other metal mold part is formed to have a plural of vapor holes connected with the above-mentioned chamber respectively. And when an expansion molding is performed, the filled expanded beads in this mold pattern are heat-expanded by feeding of a steam from the vapor holes of the above-mentioned the other metal pattern part to inside of the mold pattern.

In this case, for a purpose of effective expansion molding by preheating of the above-mentioned surface skin material to be preformed, it is common that the above-mentioned one metal pattern part is preheated by feeding of a steam into inside of the above-mentioned chamber before this surface skin material is placed on.

Nevertheless, in the above-mentioned (a) conventional example, since the outer edge part of the above-mentioned surface skin material 3 is at a state of standing from tip 7c of the above-mentioned folding back part 7 at a prescribed angle against back face 5b of cellular molded article (cellular molded article in a mold pattern) 5, when the above-mentioned outer edge part is trimmed off at tip 7c of folding back part 7, a prescribed length of projected edge part may remain. In such a case, when transportation, assembling process or the like of the cellular molded article having a surface skin material (cellular molded article having a surface skin in a mold pattern) is conducted, since the above-mentioned projected edge part may often hang up with the other member materials, there is a problem of easily peeled from tip 7c of the above-mentioned folded back part 7.

And also, in the above-mentioned (b) conventional example, since the trim process and the adhesion process for a prescribed range of folded back part 7, which is necessary when an insert member material is melt united to one piece, are needed all by hand works, there is a problem of requiring much labor.

Moreover, in the above-mentioned (c) conventional example, when the above-mentioned one metal pattern part is preheated, since the metal pattern part is totally heated by feeding a steam into the inside of its chamber, there is a problem of insufficient heating efficiency. In furthermore, when the above-mentioned surface skin material is place on by a vacuum forming, even though the above-mentioned one metal pattern part has been preheated by steam, at a time of decompression, since the heat is taken away by a vaporizing heat of condensed moisture within the chamber, there is a problem of lowering temperature of the metal pattern part, by which an efficient vacuum forming will not be successful. And furthermore, when the metal pattern part is preheated directly by steam, moisture or water drop will remain on the surface of metal pattern part, consequently, since this water drops or the like are stuck on surface of the skin material, there is a problem that surface appearance of the surface skin material is deteriorated, at the same time, when the surface skin material is placed on the one metal pattern part by a heat-molding such as vacuum forming, there is a problem of lowering its elongation property at a time of heat-molding.

This invention has been done for solving the above-mentioned problems,
(1) the folded back part, which is folded back to backside face of a cellular molded article in mold a pattern and melt united to one piece, is hardly peeled off,
(2) less hand working even when an insert member material is assembled,
(3) an expansion molding or a heat-molding of the surface skin material can be done effectively,
(4) improving the surface property of the surface skin material and/or the elongation property at a heat-molding, (5) good heat efficiency of the metal pattern part at a time of preheating on which the surface skin material is placed, it is objecting to provide a method for producing a cellular molded article having a surface skin in a mold pattern and a molded article thereof.

DISCLOSURE OF THE INVENTION

An essential feature residing in a method for producing a cellular molded article having a surface skin in a mold pattern of this invention which is claimed is that, in a method for producing a cellular molded article having a surface skin in a mold pattern in which the above-mentioned surface skin material is melt united to one piece with the surface of the cellular molded article in the mold pattern which is molded by an expansion molding within this mold pattern, after the surface skin material is heat-molded along a cavity face of the mold pattern, it is characterized in that when the above-mentioned heat-molding, after the outer edge part of the above-mentioned surface skin material is folded back toward the inside direction of the mold pattern and formed a folded back part along the pattern for folding back which is arranged so as opening the edge of the above-mentioned cavity face to project toward the inside direction of the mold pattern, and then, the above-mentioned pattern for the folding back is removed, thereafter, at a time of the above-mentioned expansion molding, the one face of the above-mentioned folded back part is melt united to one piece with the back face of the cellular molded article in the mold pattern as well as the folded returning part, which is in a state that the outer edge part of the surface skin material is folded back toward an outside direction of the mold pattern from the tip of this folded back part, is pressed so as to pile on the other face of the above-mentioned folded back part. Accordingly, a cellular molded article having a surface skin in a mold pattern can be produced in one serial process by using the above-mentioned mold pattern, and therefore, there is an advantage of that the assembling process for folding back the surface skin material to the back face of the above-mentioned cellular molded article in the mold pattern is unnecessary. Furthermore, by applying the above-mentioned whole process, there is another advantage of that, by pressing the above-mentioned folded returning part so as to be piled on the other face of the folded back part, the above-mentioned folded back part can be easily molded so as to be in a state of simply piled or melt adhered to one piece, in other words, so as to be in a state of approximately parallel position against the back face of the above-mentioned cellular molded article in the mold pattern. Moreover, in order to protect the surface side appearance of the cellular molded article having the surface skin in the mold pattern, the outer edge part of the above-mentioned surface skin material may be trimmed off simply by making the tip of the folded returning part to be positioned at the inside direction of the mold pattern from the base edge of the folded back part. Therefore this trimming work is advantageously to be done easily and is not necessarily to take care much for it.

An essential feature residing in what we claim is that, at a time of heat-molding, the above-mentioned folded returning part is pre-formed beforehand to a state that it is folded back to the outside direction of the mold pattern as in a manner to be rolling up the pattern for folding back from the tip of the above-mentioned folded back part. Accordingly, only by clamping the above-mentioned mold pattern parts completely, the above-mentioned folded returning part can easily be pressed so as to be piled on the other face or the like of the folded back part. Therefore, when the above-mentioned expanded beads are filled into the mold pattern, hand-work of that, the outer edge part of the surface skin material which will become to be the folded returning part is folded as returning from the tip of the folded back part to the outside direction of the mold pattern, can advantageously be omitted.

An essential feature residing in what we claim is that the outer part of the above-mentioned surface skin material is trimmed off beforehand so as the tip of the folded returning part to be positioning inside of the mold pattern from the base edge of the folded back part. Accordingly, after production of a cellular molded article having a surface skin in a mold pattern, the trimming work of unnecessary outer edge part of the surface skin material is omitted, and also, the above-mentioned folded returning part is made to be melt united to one piece with the other face of the folded back part so that this folded back part will not be peeled out. These are also advantages.

An essential feature residing in what we claim is that an angle between the cavity face and the pattern for folding back at the above-mentioned opening edge is set up larger beforehand than an angle between the back face and an edge of the surface of the above-mentioned cellular molded article in the mold pattern. Accordingly, at a time of heat-molding such as the above-mentioned vacuum forming, an angle between the folded back part of the surface skin material and the surface part at the above-mentioned opening edge can be made larger than that of afore-mentioned conventional case. By this reason, when the expanded beads are filled into the above-mentioned mold pattern, the expanded beads are more easily filled to the outer corner part of back face of the above-mentioned cellular molded article in the mold pattern as well, consequently, the expansion molding of a cellular molded article in a mold pattern advantageously can be done more uniformly.

An essential feature residing in what we claim is that, at a time of the above-mentioned expansion molding, an insert member is connected with at least either one of the above-mentioned folded back part or folded returning part. Accordingly, there is an advantage in that the trimming process of folded back part by hand-work and the adhesion process which are used in the conventional process are not necessary and thus hand-working is lessened. Furthermore, even when these folded back part and folded returning part are formed, a connecting position of the insert member is not limited to a specified position but advantageously is enabling to connect with various position in a vicinity of the outer edge part on the back face of the above-mentioned cellular molded article in the mold pattern.

An essential feature residing in what we claim is that, before the above-mentioned heat molding is done, a cut off part for setting up the insert member at the tip of the above-mentioned pattern for folding back is prepared beforehand. Accordingly, the folded back part or the like can be formed with a prescribed space being prepared at the inside direction of this cut off part for setting up the insert member. Namely, when the insert member is connected with backside of the cellular molded article in a mold pattern, the folding back of the surface skin material or the like can be done automatically in a manner of averting this insert member, and thus there is an advantage of lessening the hand-work.

In further, an essential feature residing in what we claim is that it comprises a cellular molded article in a mold pattern and a surface skin material which is comprising in that a surface part which is melt united to one piece with the surface of the said cellular molded article in the mold pattern, a folded back part in which the edge part of said surface part is folded back toward the inside direction of the mold pattern and of which one face is melt united to one piece with the backside of the above-mentioned cellular molded article in the mold pattern, and a folded returning part which is folded returning so as to pile on the other face of this folded back part from the tip of said folded back part to the outside direction of the mold pattern and at the same time so as its tip to be positioning in the inside direction of the mold pattern from the base edge of the folded back part. Accordingly, when said cellular molded article having the surface skin is transported or assembling processed, the tip of the above-mentioned folded back part and folded returning part are hardly hung on the other member material or the like and thus it is advantageous that the above-mentioned folded back part is hardly peeling out. And also, in the above-mentioned piled part of folded back part with the folded returning part, there is an advantage of that a cushioning property and/or reinforcing effect can be raised.

An essential feature residing in what we claim is that the above-mentioned folded returning part is melt united to one piece with the other face of the folded back part. Accordingly, the folded returning part is hardly peeling out, which is also advantageous.

An essential feature residing in what we claim is that an insert member is united with at least either the above-mentioned folded back part or folded returning part. Accordingly, the strength of united part of this insert member with the above-mentioned folded back part or folded returning part is advantageously more increased.

An essential feature residing in what we claim is that the above-mentioned folded back part and folded returning part are folded back and folded returning in a manner to avert the insert member which is melt united to one piece with backside of the above-mentioned cellular molded article in the mold pattern. Accordingly, the above-mentioned insert member can be melt united as well in a manner that is buried in the back face of said cellular molded article in the mold pattern, which is advantageous in that an assembling variation for the insert member can advantageously be broadened.

An essential feature residing in what we claim is that the above-mentioned surface skin material and cellular molded article in the mold pattern consist of polyolefine resin. Accordingly, a melt uniting of such surface skin material with the cellular molded article is hard, at the same time, there is an advantage in that recycling of it is easy since it is so-called all polyolefine.

An essential feature residing in what we claim is that the above-mentioned surface skin material, the cellular molded article in the mold pattern and the insert member consist of a polyolefine resin, accordingly, in addition to the above-mentioned what we claim, the melt uniting of the surface skin material or the cellular molded article in the mold pattern with the insert member is more hard, and in further, recycling is easy as well, which is also advantageous.

In addition to these, an essential feature residing in what we claim is that, in a method for producing a cellular molded article having a surface skin in a mold pattern by a method which the cellular molded article in the mold pattern to be formed with filling of the expanded beads and the above-mentioned surface skin material are melt united to one piece by an expansion molding within this mold pattern after the surface skin material is placed on either one of the two metal mold parts which are composing a mold pattern, to a part of the above-mentioned one metal mold part which at least is composing an exposure face to the inside direction of the above-mentioned mold pattern, a heater which will enable to keep this exposure face at a prescribed temperature is assembled. By this method, the above-mentioned exposure face is pre-heated at a prescribed temperature before the above-mentioned expansion molding. And at the same time, said preheating is done by steam of lower temperature than that of the above-mentioned expanded beads to be melt-uniting each other, and after the steaming for keeping this state for a prescribed period, by a vacuuming of the inside of the above-mentioned mold pattern, the condensate residing inside of it is evacuated.

Accordingly, the surface skin material being placed on this exposure face is also pre-heated up to a prescribed temperature. Consequently, the expansion molding, namely, the melt uniting of the surface skin material with the expanded beads which make expansion within the mold pattern can be effectively done, which is an advantage as well. Also, as heating only for the above-mentioned exposure face is possible, the heat effectiveness is superior. Moreover, since the moisture or water drops will not remain on this exposure face when preheating of the above-mentioned exposure face is taken place, the surface appearance of the surface skin material can be improved, and at the same time, when the surface skin material is placed on one of the metal mold patterns by a heat-molding, the elongation property at its heat-molding is also advantageously improved. In addition, by means of preheating of said expanded beads by steam, steaming thereof and evacuation of the condensate as described above, an insufficient melt uniting of said expanded beads by themselves and an insufficient melt uniting of said expanded beads with the surface skin material will not be caused, and at the same time, by a preheating of the cavity face by a heater, the condensate can easily be evacuated. Thus these are also advantages.

An essential feature residing in what we claim is that the above-mentioned surface skin material and cellular molded article consist of polyolefine resins. Accordingly, melt uniting of these surface skin materials with the cellular molded article can be made tighter, and also, the obtainable cellular molded article having a surface skin in a mold pattern is so-called "all olefin", by which recycling is advantageously easy as well.

An essential feature residing in what we claim is that the temperature of the exposure face before the above-mentioned expansion molding is set up at in a range from 60 to 150° C. Accordingly, the surface skin material placed on this exposure face is becoming appropriately softened, and by this reason, a melt uniting of the surface skin material with the expanded beads can be more effectively done, which is advantageous as well.

An essential feature residing in what we claim is that the above-mentioned surface skin material is placed on one of the above-mentioned metal mold parts by a heat-molding. Accordingly, the hand-works for pre-adjusting to the surface formation of the above-mentioned one metal mold part by the other molding process beforehand or the like can be advantageously omitted.

An essential feature residing in what we claim is that the above-mentioned exposure face is pre-heated up to a prescribed temperature before the above-mentioned heat-molding. Accordingly, a temperature lowering of the softened surface skin material to be tightly contacted with this exposure face can be minimized, and by this method, a heat-molding such as vacuum forming can be effectively done, which is also advantageous as well.

An essential feature residing in what we claim is that the above-mentioned temperature of exposure face before the above-mentioned heat-molding is set up at in a range from 60 to 150° C. Accordingly, when the above-mentioned surface skin material and cellular molded article are composed of a polyolefine line resin, the above-mentioned surface skin material can be heat-molded at an appropriate softened state, consequently, the final property of product can advantageously be improved as well.

An essential feature residing in what we claim is that at least a part which is composing of the above-mentioned exposure face consists of a gas permeable electric cast mold, a gas permeable metal mold or a gas permeable ceramic mold. Accordingly, when the above-mentioned surface skin material is placed on by a vacuum forming, the air and gas residing between said gas permeable electric cast mold or the like and said surface skin material can more easily be evacuated. By this reason, there is an advantage that the above-mentioned surface skin material can more surely be contacted with said exposure face, and at the same time, since the diameter of said gas permeable holes is very fine, marks of these gas permeable holes will not be printed on the surface of the above-mentioned surface skin material.

An essential feature residing in what we claim is that an unevenness for product design pattern is pre-formed on the above-mentioned exposure face beforehand. Accordingly, there is an advantage of that when said surface skin material is placed on by a heat molding such as a vacuum forming, the above-mentioned unevenness for product design pattern can be printed on the surface of said surface skin material, and by this reason, the hand-works for it can be omitted.

BEST MODE FOR PRACTICING THE INVENTION

Figure 1:
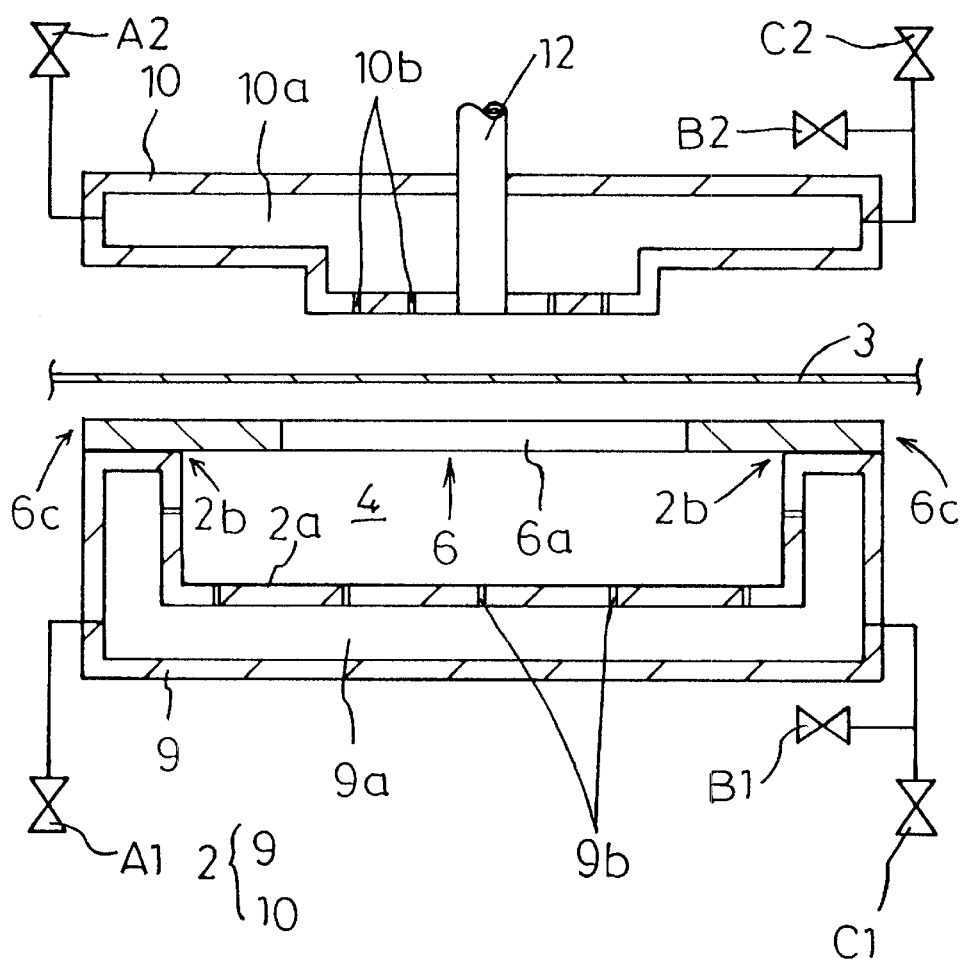
FIG. 1 is a cross-sectional drawing of a state that a mold pattern for folding back is placed on a female mold pattern in a method for producing a cellular molded article in a mold pattern which is relating to the embodiment of example 1.

Embodiments of this invention are described below, based on the drawings, and when the same composition as the above-mentioned prior art comes out, its explanation is abbreviated by using the prescribed mark.

As illustrated in FIG. 1 to FIG. 7, a method for producing a cellular molded article having a surface skin in a mold pattern which is relating to the embodiment of example 1 is that, after a surface skin material 3 is heat-molded, such as vacuum-forming, along a cavity face 2a of a mold pattern 2, by an expansion molding within this mold pattern 4, the above-mentioned surface skin material 3 is melt united to one piece with a surface 5a of a cellular molded article in a mold pattern 5 which is molded.

And, this producing method is that, when the above-mentioned vacuum forming, after the outer edge part of the above-mentioned surface skin material 3 is folded back to the inside direction of the mold pattern and is formed up a folded back part 7 along a mold pattern for a folding back 6 which is placed as in a manner of projecting from an opening edge 2b of the above-mentioned cavity face 2a toward the inside direction of the mold pattern, the above-mentioned mold pattern for the folding back 6 is removed out, and then when the above-mentioned expansion molding, one face 7a of the above-mentioned folded back part 7 is melt united to one piece with a back face 5b of the cellular molded article in the mold pattern 5, and at the same time, a folded returning part 8, which is in a state that the outer edge part of the surface skin material 3 is folded returning toward outside of the mold pattern from a tip 7c of this folded back part 7, is pressed so as to pile on the other face 7b of the above-mentioned folded back part 7.

Namely, as illustrated in FIG. 1, at first, onto a female mold pattern 9 to be composing a lower mold pattern, for example, of the above-mentioned mold pattern 2, the above-mentioned mold pattern for folding back 6 is set up in a manner of projecting a prescribed length toward the inside direction of the mold pattern from the opening edge 2b of the cavity face 2a.

In this stage, the above-mentioned mold pattern 2 is, for example, composed of the above-mentioned female mold pattern 9 and male mold pattern 10 which are able to clamp and open the mold patterns in up-down direction, and at the same time, the female mold pattern 9 is to be a lower mold pattern and the male mold pattern 10 is to be an upper mold pattern.

The above-mentioned female mold pattern 9 is, for example, that its horizontal cross-sectional face is a concave shape and a chamber 9a is formed in its inside, and a plural of decompression holes 9b connecting through to the above-mentioned chamber 9a are formed on its cavity face 2a side. And, a vapor valve A1, a decompression valve B1 and a drain valve C1 are connected with the above-mentioned chamber 9a respectively.

The above-mentioned male mold pattern 10 is, for example, that its horizontal cross-sectional face is a convex shape and a chamber 10a is formed in its inside, and for example, a plural of vapor holes 10b connecting through to the above-mentioned chamber 10a are formed on its projected part. And, the vapor valve A2, the decompression valve B2 and the drain valve C2 are connected with the above-mentioned chamber 10a respectively, and a feeder 12 for feeding expanded beads 11 into the above-mentioned mold pattern is also set up.

Figure 2:
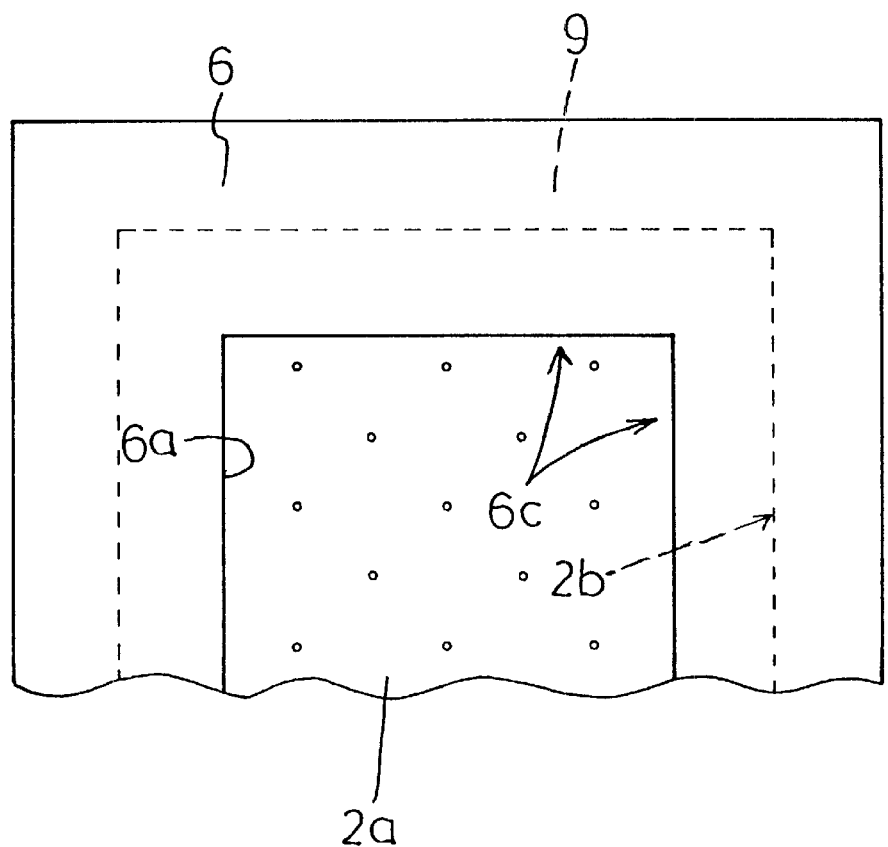
FIG. 2 is a plan view illustrating a placement state of the mold pattern for folding back in FIG. 1.

The above-mentioned mold pattern for the folding back 6 is, for example as illustrated in FIG. 1 and FIG. 2, is formed to a rectangle shape having a rectangle opening part 6a in plan view toward the inside direction of the mold pattern and is able to remove toward the outside direction of the mold pattern by dividing into a plural of pieces at a prescribed position (not shown). When this mold pattern for the folding back 6 is placed on the above-mentioned female mold pattern 9 by a placing-on, or by a magnetic connecting or the like, it is shaped in projecting from the opening edge 2b of the above-mentioned cavity face 2a toward the inside direction of the mold pattern with a prescribed length. In addition to it, this mold pattern for the folding back 6 may be made as enabling to divide into a plural of pieces, and also, may be made as possible to slide freely on in-out direction respectively by applying a cylinder or the like for placing it on and removing it out.

Figure 3:
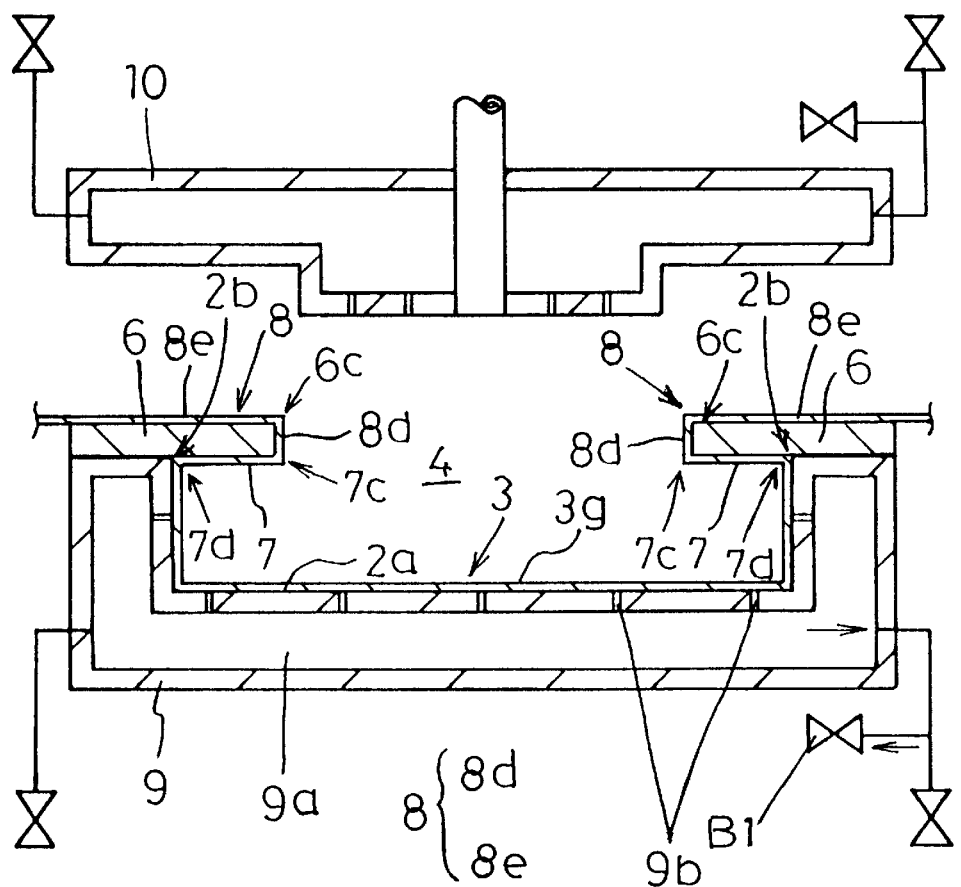
FIG. 3 is a cross-sectional drawing illustrating a state of vacuum-formed surface skin material described in FIG. 1.

Next, as illustrated in FIG. 3, the above-mentioned surface skin material 3, which is prepared to be in a heat-softened state beforehand, is placed on the mold pattern for the folding back 6, and with applying of such as opening the decompression valve B1 which is connected with the chamber 9a of the above-mentioned female mold pattern 9, by forming the surface skin material 3 to fit along the above-mentioned cavity face 2a such as by vacuum forming, the outer part of this surface skin material 3 is formed to a shape with the folded back part 7 by folding back toward the inside direction of the mold pattern along the above-mentioned mold pattern for the folding back 6, and at the same time, the folded returning part 8 is also formed by fold returning toward the outside direction of the mold pattern from the tip 7c of this folded back part 7 as in a manner of rolling up the mold pattern for the folding back 6. Furthermore, in this state, by heating up the above-mentioned female mold pattern 9 and/or the mold pattern for the folding back 6 to a prescribed temperature in advance, the heat molding of the surface skin material 3 can advantageously be done more effectively.

In this state, if a tip 6c of the above-mentioned mold pattern for the folding back 6 was prepared to be made as in this embodiment to a rectangle of its horizontal cross-sectional face shape, the above-mentioned folded returning part 8 is composed of a vertical piece 8d which is folded bending toward upper direction from the tip 7c of the above-mentioned folded back part 7 and a horizontal piece 8e which is folded bending toward outer direction from the upper tip of said vertical piece 8d. In further, horizontal cross-sectional shape of the tip 6c of the above-mentioned mold pattern for the folding back 6 can be made to a triangle shape, a trapezoid shape, a round shape or an oval shape besides the rectangle shape.

As the examples of the above-mentioned surface skin material 3, a thermoplastic resin sheet including a vinyl chloride resin or a polyolefine resin such as a polyethylene resin, a polypropylene resin can be mentioned among others. And since this surface skin material is used as a surface skin of the cellular molded article having a surface skin 1, this surface skin material may be colored with a desired color by a coloring toner or the like according to the application.

As a method for heat molding said surface skin material along the above-mentioned cavity face 2a, it is not limited to vacuum forming like in this embodiment but other molding such as compression molding can also be applied. And also, in a case of such compression molding being applied, when the above-mentioned surface skin material 3 is heat-molded along the cavity face 2, it can be formed only of said folded back part 7 without forming the above-mentioned folded returning part 8.

Figure 4:
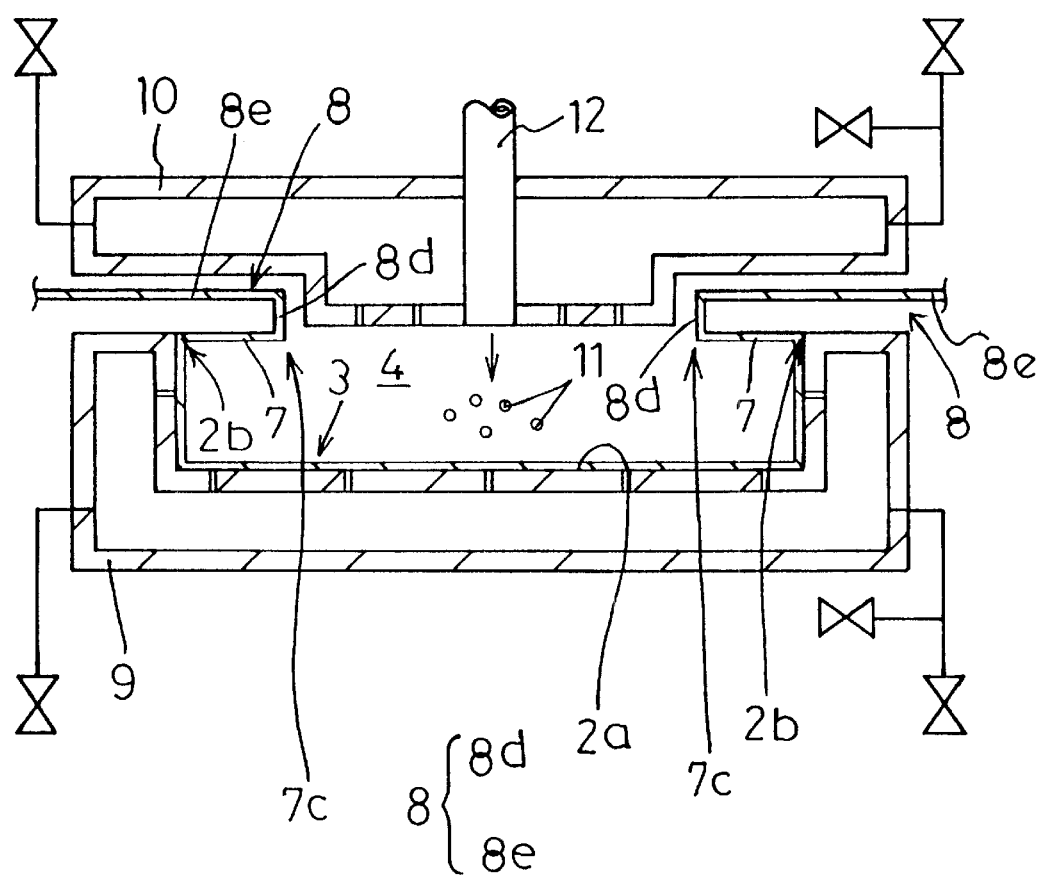
FIG. 4 is a cross-sectional drawing illustrating a state of filling the expanded beads to the inside of a mold pattern.

Next, as illustrated in FIG. 4, after the above-mentioned mold pattern for folding back 6 is removed toward the outside direction of the mold pattern by pulling out for example, the metal mold pattern is clamped and then expanded beads 11 are filled into inside of mold pattern 4 from the above-mentioned feeder 12.

In this stage, in order to make the air presenting in the above-mentioned mold pattern 4 to be evacuated easily, and also in order that folded back part 7 of the above-mentioned surface skin material 3 will not be folded into downward, clamping is preferably made in a state of having a small opened space in between (cracking state). And, as is stated above, when the above-mentioned surface skin material 3 is heat-molded along cavity face 2a, in a case of forming only for the folded back part without forming the above-mentioned folded returning part 8, clamping is preferably made as in a manner that the outer edge part of surface skin material 3, which will become folded returning part 8, is folded returning toward the outside direction of the mold pattern from the tip 7c of folded returning part 7.

As examples of the synthetic resin comprising the above-mentioned expanded beads 11, polyolefine resin, polystyrene resin can be mentioned among others.

As examples of the above-mentioned polyolefine resin, polyethylene resin or polypropylene resin such as low density polyethylene, middle density polyethylene, high density polyethylene, linear low density polyethylene, ethylene-vinyl acetate copolymer, propylene homopolymer, ethylene-propylene random copolymer, ethylene-propylene block copolymer, ethylene-propylene-butene random terpolymer, propylene-vinyl chloride copolymer, propylene-butene copolymer, propylene-maleic anhydride copolymer, poly(butene-1) can be mentioned among others, and these can be used alone or as a mixture of not less than two.

This polyolefine resin is preferably not cross-linked, however, may be cross-linked by using a peroxide, radiation or the like.

Furthermore, a mixture of this polyolefine resin and other thermoplastic resin can be used. As examples of these thermoplastic resins when mixing with the above-mentioned polypropylene resin, low density polyethylene, linear low density polyethylene, vinyl aromatic polymer, polybutene, ionomer can be mentioned among others. And when mixing with the above-mentioned polyethylene resin, for example, vinyl aromatic polymer, polybutene, ionomer can be mentioned among others. And the amount of the thermoplastic resin to be mixed in these cases is preferably not more than 20 parts by weight based on 100 parts by weight of the polypropylene resin, more preferably 5 to 10 parts by weight.

The above-mentioned expanded beads 11 may be produced, for example, by a pre-expansion molding with using a method in which the above-mentioned synthetic resin is processed to form particle shape in advance, impregnated with a volatile blowing agent in a pressurized vessel, stirred while dispersed in water, heated up under pressure to a prescribed expansion temperature, and then this water dispersion is released into a low pressure region or the like.

As for the expansion ratio when these expansion beads 11 are expanded in the mold pattern, in a case of less than 3 times, cushioning property or the like may be lowered, and in a case of more than 60 times, shrinkage of the above-mentioned cellular molded article in the mold pattern may be enlarged and at the same time it may have a tendency of lowering its strength due to be excessively softened. Therefore, 3 to 60 times of the expansion ratio is preferable, more preferably 5 to 50 times, furthermore preferably 8 to 45 times, and most preferably 10 to 35 times. As such expansion beads, for example, EPERAN-PP (trade name; made by KANEKA CORPORATION, expansion ratio is 15 times) can be suitably used among others.

In these occasions, the above-mentioned expanded beads may be filled into the above-mentioned mold pattern 4 in a state of imparted with an inner pressure by spreading a pressurized gas in advance, or may be filled into it in a state of compressed by using a pressurized gas, or may also be filled into it in a state as it is without being imparted with an inner pressure or compressed.

On the other hand, in order to improve the adhesion property of the cellular molded article to be obtained by an expansion molding in mold pattern 5 of expanded beads 11 with the above-mentioned surface skin material 3, if necessary, on back face 3g of this surface skin material 3 which will contact with the above-mentioned expanded beads 11 and on one face 7a which faces to downward of the above-mentioned folded back part 7, an adhesive may be coated in advance. As such adhesives, for example, organic solvent solution of a synthetic resin, resin emulsion and resin powder can be mentioned among others. And as such resins to be used for these, for example, a polyolefine resin such as ethylene-vinylacetate resin, polypropylene, polyethylene, ethylene-propylene copolymer, chlorinated polypropylene, chlorinated polyethylene, ethylene-propylene-butene terpolymer, a mixture of these or the like can be mentioned among others.

Figure 5:
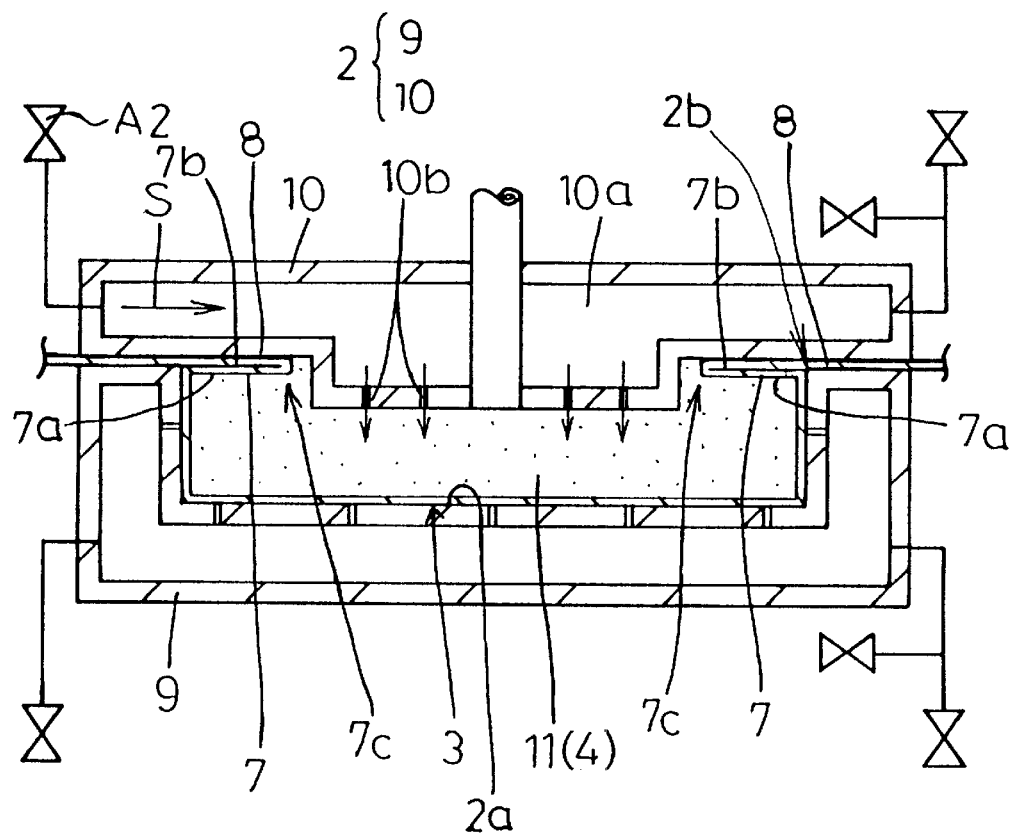
FIG. 5 is a cross-sectional drawing illustrating a state of an expansion molding.

Next, as illustrated in FIG. 5, after clamping said mold pattern in complete, vapor valve A2 which is connected with chamber 10a of the above-mentioned male mold pattern 10 is opened and steam S is supplied into inside of mold pattern 4 through the above-mentioned vapor holes 10b, and thus the above-mentioned expanded beads are made to be heat-expanded.

On top of this, when the above-mentioned expanded beads 11 are heat-expanded, in order not to cause any insufficient melt uniting, if necessary, a preheating at a lower temperature than the temperature for melt uniting of said beads with each other may be done by steam S, or a steaming which is kept at a state of as it is for a prescribed time may be done as well, and in further, removal of the condensate by a vacuuming or the like after said steaming may also be done in advance.

While, as a time for clamping the mold pattern in complete, it is preferably done at a time that the above-mentioned expanded beads 11 are filled in the mold pattern 4 in almost full, and at this occasion, expanded beads 11 are preferably filled in the mold pattern 4 until complete fullness. By such means, since the above-mentioned folded back part 7 will not be folded toward down direction by support of full expanded beads 11 which are filled in the mold pattern 4, after the above-mentioned expansion molding, formation of void between this folded back part 7 and the above-mentioned folded returning part 8 can advantageously be avoided.

In this occasion, vertical portion 8d of the above-mentioned folded returning part 8 will be bent toward the outside direction of the mold pattern from tip 7c of the above-mentioned folded back part 7 and will be pressed on the other face 7b of this folded back part 7 as being piled up. While, the above-mentioned horizontal portion 8e will be pressed on the other face 7b and on female pattern 9 as being piled up. Then, since expanded beads 11 are heat-expanded at this state, surface skin material 3 will be melt united to one piece with surface 5a of cellular molded article in the mold pattern 5 which will be formed, and simultaneously one face 7a of the above-mentioned folded back part 7 will be melt united to one piece with back face 5b of cellular molded article in the mold pattern 5. In addition, the above-mentioned folded returning part 8 will be pressed as is above-mentioned and simultaneously will be formed so as to be piled simply on the other face 7b of folded back part 7 or to be melt united to one piece therewith by steam heating. As is above-mentioned, folded returning part 8 may be simply bent, or may be melt united to one piece with the other face 7b of the above-mentioned folded back part 7 according to a property of the above-mentioned surface skin material 3, a condition of temperature or the like.

Figure 6:
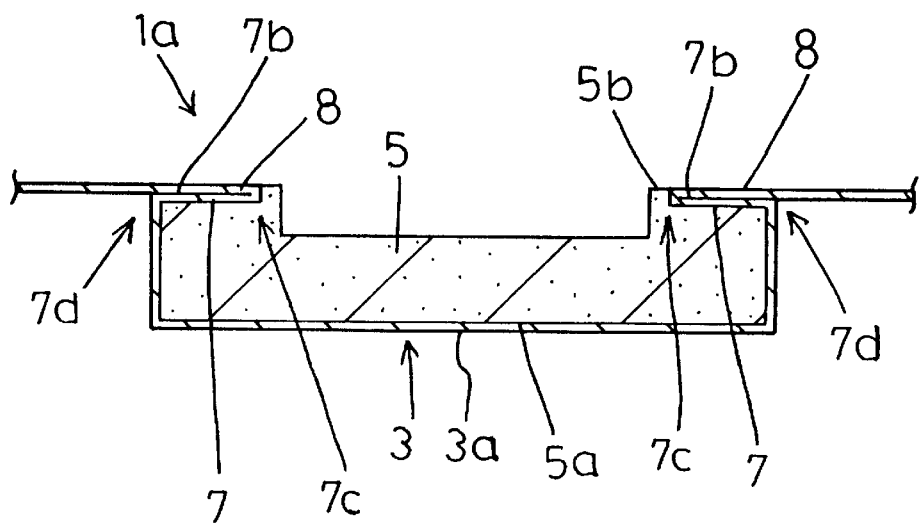
FIG. 6 is a cross-sectional drawing illustrating a state of a cellular molded article having a surface skin in a mold pattern being removed from the mold pattern.

Next, after a cooling if it is necessary, by opening the above-mentioned mold pattern 2 and removing from it, as is illustrated in FIG. 6, cellular molded article having a surface skin in a mold pattern 1a which is comprising an obtained expanded molded article in a mold pattern 5 by an expansion molding in mold pattern of the above-mentioned expanded beads 11 and surface skin material 3, which is comprising surface skin part 3a which is melt united to one piece with surface 5a of the said cellular molded article in the mold pattern 5, folded back part 7 in which the edge part of said surface part 3a is folded back toward the inside direction of the mold pattern and of which one face is melt united to one piece with the backside of the above-mentioned cellular molded article in the mold pattern 5, and folded returning part 8 which is folded returning so as to pile on the other face 7b of this folded back part 7 from tip 7c of said folded back part 7 to the outside direction of the mold pattern, can be obtained.

Figure 7:
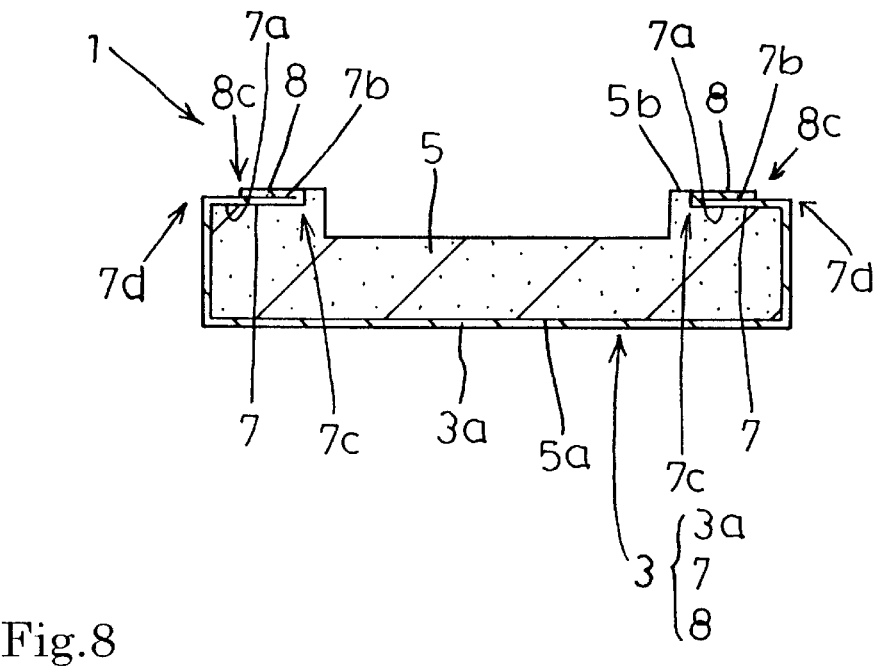
FIG. 7 is a cross-sectional drawing illustrating a state after an unnecessary outer edge part of the surface skin material shown in FIG. 6 has been trimmed off.

Next, by a measure that in order not to deteriorate its appearance, the unnecessary outer edge part of surface skin material 3 is trimmed off so that tip 8c of the above-mentioned folded returning part 8 is trimmed off at an appropriate site for positioning it at the inside direction of the mold pattern from base edge 7d of the folded back part 7, namely, the edge of the above-mentioned surface part 3a, cellular molded article having a surface skin in a mold pattern 1 can be obtained as is illustrated in FIG. 7. Consequently, in order to trim off as such, the above-mentioned folded returning part 8 is preferably formed to a state that it is not melt united to one piece with the other face 7b of folded back part 7 but simply is bent to pile on.

As is above-mentioned, since a cellular molded article having a surface skin in a mold pattern 1 as composed of the above can be produced in one serial process by applying the above-mentioned mold pattern 2, the folding back and adhesion processes of surface skin material 3 with back face 5b of the above-mentioned cellular molded article in a mold pattern 5 by hand-works can advantageously omitted. And also, by the above-mentioned serial process, the above-mentioned folded returning part 8 can easily be formed so as to pile on the other face 7b of folded back part 7, namely, to be approximately in parallel to back face 5b of the above-mentioned cellular molded article in a mold pattern 5, which is advantageous.

Accordingly, when cellular molded article having a surface skin in a mold pattern 1 is transported or assembling processed, tip 7c of the above-mentioned folded back part 7 and folded returning part 8 are hardly hung on the other member material or the like and thus it is advantageous that the above-mentioned folded back part 7 is hardly peeling out. On the other hand, in order not to deteriorate appearance of the above-mentioned surface part 3a side on cellular molded article having a surface skin in a mold pattern 1, since the outer edge part of the above-mentioned surface skin material 3 is simply trimmed off so as tip 8c of folded returning part 8 to be positioning at the inside direction of the mold pattern from base edge 7d of folded back part 7, this trimming work is easily done without any particular caution on it, which is advantageous. On top of that, there is an advantage that the cushioning property and reinforcing effect are raised on the piled portion of the above-mentioned folded returning part 8 with folded back part 7.

And, as is in this embodiment, when the above-mentioned folded returning part 8 is heat-molded by such as vacuum forming, if it is formed so as to be folded returning toward the outside direction of the mold pattern as being rolling up said pattern for folding back 6 from tip 7c of the above-mentioned folded back part 7 in advance, as is above-mentioned, since this folded returning part 8 can easily be pressed on the other face or the like of folded back part 7 so as to be piled up, when the above-mentioned expanded beads 11 are filled into inside of mold pattern 4, hand-works for fold returning of the outer edge part of surface skin material 3 which will become to folded returning part 8 toward the outside direction of the mold pattern from tip 7c of folded back part 7 can be omitted advantageously.

In further, in a case that the above-mentioned surface skin material 3 and cellular molded article in a mold pattern 5 in said cellular molded article having a surface skin in a mold pattern 1 are composed of a polyolefine resin, the melt uniting of these surface skin material 3 with cellular molded article in a mold pattern 5 can be made harder, and at the same time, as it is so-called all olefin, recycling of it can be made more easily, which is also advantage.

Figure 8:
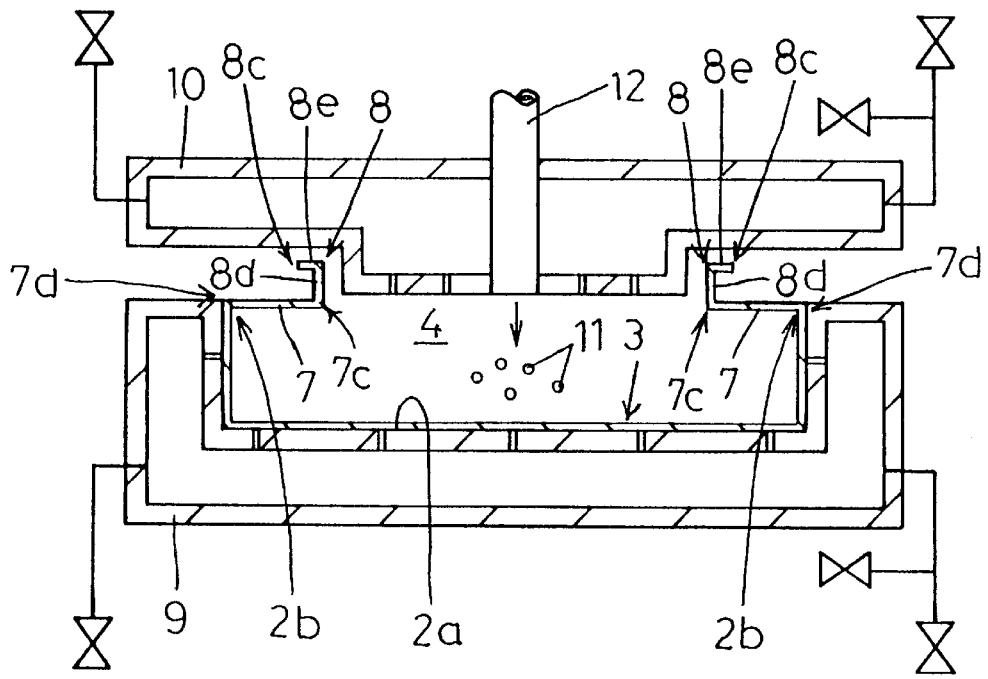
FIG. 8 is a cross-sectional drawing illustrating a state of filling the expanded beads into inside of the mold pattern in a method for producing a cellular molded article having a surface skin in a mold pattern which is relating to the embodiment of example 2.
Figure 9:
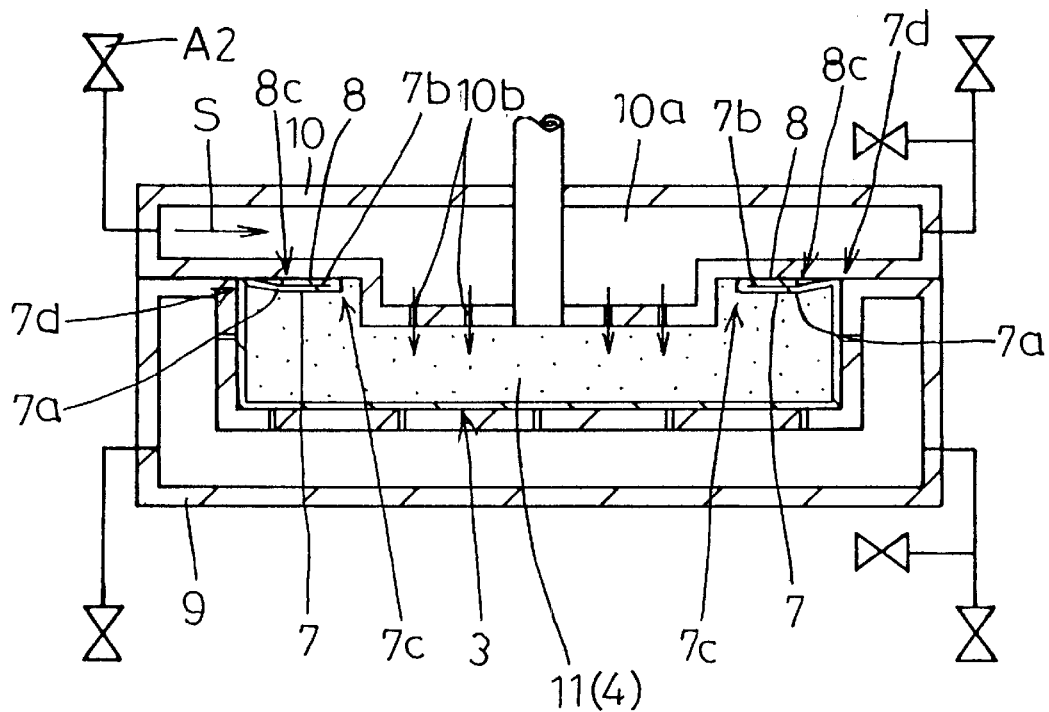
FIG. 9 is a cross-sectional drawing illustrating a state of an expansion molding.
Figure 10:
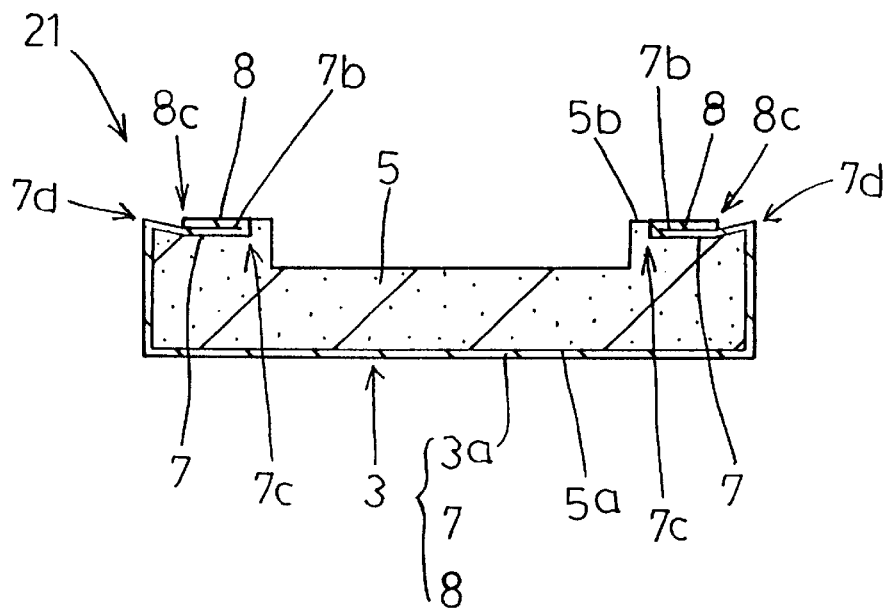
FIG. 10 is a cross-sectional drawing illustrating a state of a cellular molded article having a surface skin in a mold pattern being removed from the mold pattern.

As illustrated in FIG. 8 to FIG. 10, a method for producing a cellular molded article having a surface skin in a mold pattern 21 which relates to the embodiment of example 2 is, in the above-mentioned embodiment of example 1, before the expansion molding, the outer edge part of the above-mentioned surface skin material 3 is trimmed off in advance so that tip 8c of folded returning part 8 is positioning at the inside direction of the mold pattern from base edge 7d of folded back part 7 at the time of the above-mentioned pressing.

As cases of trimming off before the above-mentioned expansion molding, a case of trimming off in advance before the heat-molding such as the above-mentioned vacuum forming, a case of trimming off simultaneously with this heat-molding and a case of trimming off between after the heat-molding and before the above-mentioned expanded beads 11 being filled into inside of said mold pattern 4 are included. Among these, as methods for simultaneous trimming off with heat-molding, for example, a method that a trimming blade projecting downward at a prescribed site of the above-mentioned male mold pattern 10 is mounted on, and at the same time, a concave fitting part which fits to this trimming blade is mounted on the upper face of the above-mentioned mold pattern for folding back 6 in advance, and by clamping said mold patterns at a time of the above-mentioned heat-molding, the outer edge part of surface skin material 3 is trimmed off, can be mentioned among others. And also, a method that, on the above-mentioned male mold pattern 10, a projected part for pressing of which tip is obtuse angle is mounted, and when clamping said mold patterns at the above-mentioned heat-molding, a prescribed site of surface skin material 3 is pressed harder than the surrounding portion, and thus, said site is heat-molded to be thinner than the other portion in advance, thereafter said outer edge part can easily be trimmed off by a small drawing force, can be mentioned among others. Furthermore, by measure of that holes like dotted-line shape are mounted on a prescribed site of the above-mentioned surface skin material 3, trimming line for peeling off (machining line) can also be formed in advance as well.

As is in the above-mentioned, if tip 8c of folded returning part 8 is positioning at a site of the inside direction of the mold pattern from base edge 7d of folded back part 7, at a time after production of a cellular molded article having a surface skin in a mold pattern 21, since trimming-off of the unnecessary outer edge portion of surface skin material 3 can be omitted, the above-mentioned folded returning part 8 can be melt united to one piece with the other face 7b of folded back part 7 so that it will not be peeled out, which is advantageous as well. In addition, as illustrated in FIG. 9 and FIG. 10, the above-mentioned folded back part 7 which is relatively shortened by trimming off as in the above-mentioned may be, in comparing with the above-mentioned embodiment of example 1, pressed by the above-mentioned folded returning part 8 and may be folded into more or less downward direction.

Figure 11:
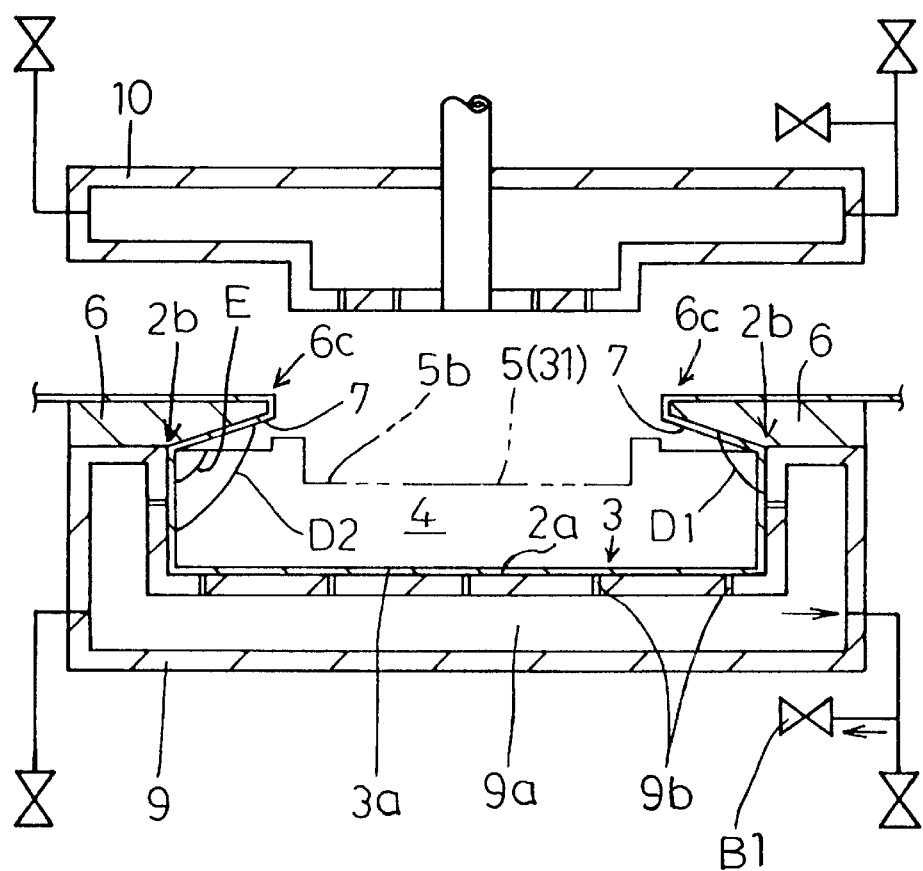
FIG. 11 is a cross-sectional drawing illustrating a state of a surface skin material being vacuum-formed in a method for producing a cellular molded article having a surface skin in a mold pattern which is relating to the embodiment of example 3.

As illustrated in FIG. 11, a method for producing a cellular molded article having a surface skin in a mold pattern 31 which relates to the embodiment of example 3 is, in the above-mentioned embodiment of example 1 or 2, that angle D1 at the above-mentioned opening edge 2b, which is formed by cavity face 2a and mold pattern for folding back 6, is set up at a larger angle than outer corner angle E of back face 5b of the above-mentioned cellular molded article in a mold pattern 5 in advance.

By this means, when the above-mentioned heat-molding such as vacuum forming, angle D2 at the above-mentioned opening edge 2b, which is formed by folded back part 7 of surface skin material 3 and surface part 3a, can be made larger than that of the conventional case which is illustrated in the above-mentioned FIG. 4 or FIG. 8. By this reason, when expanded beads 11 are filled into inside of the above-mentioned mold pattern 4, expanded beads 11 can easily be filled into a portion as well which will become the outer corner part of back face 5b of the above-mentioned cellular molded article in a mold pattern 5, and thus, there is an advantage of making said expansion molding of cellular molded article in a mold pattern to be in uniform.

In this occasion, filling of the above-mentioned expanded beads 11 may be done as same as in the above-mentioned, however, when clamping said mold pattern is done in complete, filling may be done so as the above-mentioned folded back part 7 to be bent up to a prescribed downward site, and then, full filling of them in a mold pattern 4 may be done.

Besides, in order to enlarge angle D1 which is formed by cavity face 2a at the above-mentioned opening edge 2b and mold pattern for folding back 6, for example, as is illustrated in this embodiment, horizontal cross-sectional face shape of the above-mentioned mold pattern for folding back 6 may be formed to inverted trapezoid shape or the like, or the above-mentioned mold pattern for folding back 6 may be positioned so as its tip 6c side to incline at forwarding an oblique upper direction toward the inside direction of the mold pattern.

Figure 12:
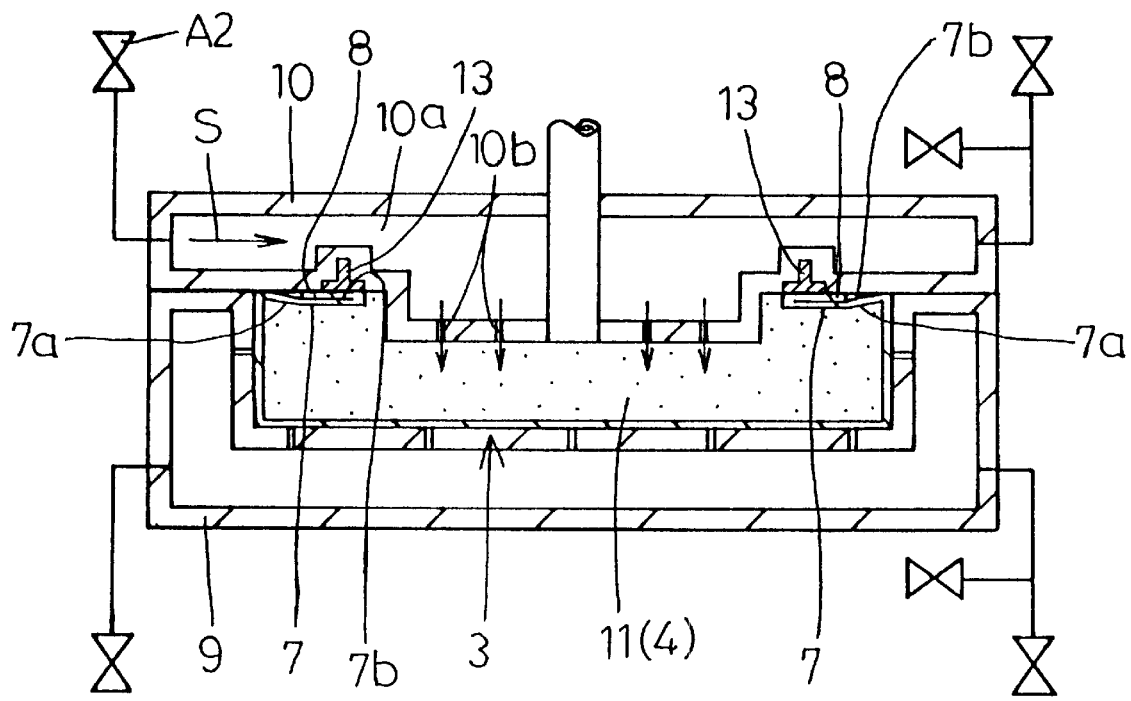
FIG. 12 is a cross-sectional drawing illustrating a state of uniting an insert member with a folded back part when expansion molding being done, which is relating to a method for producing a cellular molded article having a surface skin in a mold pattern in the embodiment of example 4.
Figure 13:
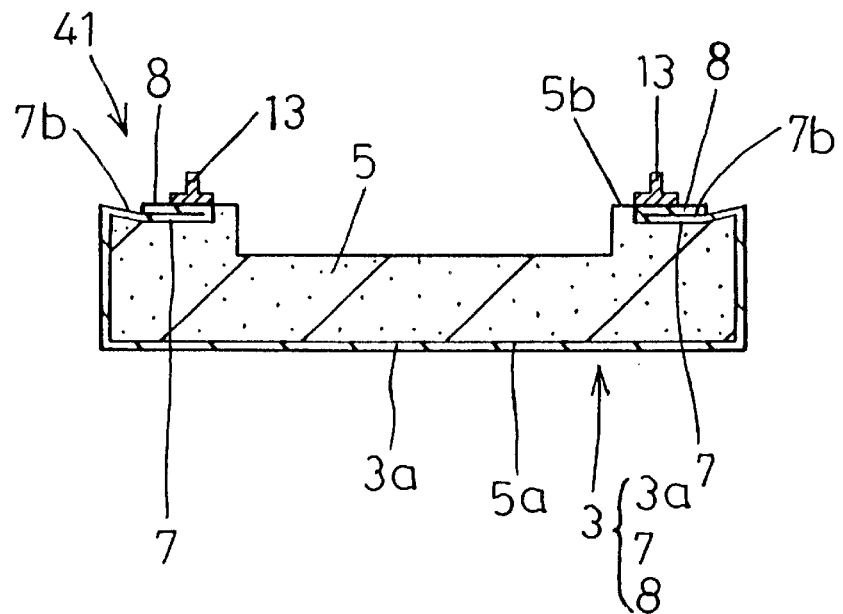
FIG. 13 is a cross-sectional drawing illustrating a state of a cellular molded article having a surface skin in a mold pattern being removed from the mold pattern.

As illustrated in FIG. 12 and FIG. 13, a method for producing a cellular molded article having a surface skin in a mold pattern 41 which relates to the embodiment of example 4 is that, in the above-mentioned embodiment of example 2, at a time of the above-mentioned expansion molding, for example, insert member 13 is connected with the above-mentioned folded returning part 8.

In this case, before the heat-molding by the above-mentioned vacuum forming or the like, or before the filling of the above-mentioned expanded beads 11, insert member 13 is placed on a prescribed site of the above-mentioned male mold pattern 10 in advance, and thereafter, when the expansion molding, that is, the expansion molding in a mold pattern of the above-mentioned expanded beads 11, is carried out, this insert member 13 may be connected with the above-mentioned folded returning part 8 or the like by adhesion or by melt uniting to one piece.

And, as a site where this insert member 13 is connected with, it is not limited only to the above-mentioned folded returning part 8, it may also be on the above-mentioned folded back part 7 or on both of these folded returning part 8 and folded back part 7 in together in further, it may also be melt united to one piece with as in a manner of extending to back face 5b of the above-mentioned cellular molded article in a mold pattern 5. Among these, when insert member 13 is connected only with the above-mentioned folded returning part 8, as is above-mentioned, it is preferably melt united to one piece with the above-mentioned folded back part 7 so as this folded returning part 8 not to be peeled out.

As is in above-mentioned, by connecting the above-mentioned insert member 13 with at least either one of folded back part 7 and folded returning part 8, the trimming off process or adhesion process of surface skin material 3 by hand-works as in the conventional method can advantageously be omitted. On the other hand, even when these folded back part 7 and folded returning part 8 are formed, the connecting site of insert member 13 is not limited to a specified site, but it can advantageously be connected with a various site in vicinity of the outer edge of back face 5b of the above-mentioned cellular molded article in a mold pattern 5.

Furthermore, in a cellular molded article having a surface skin in a mold pattern 41 which is connected with insert member 13 as mentioned above, since the strength of the above-mentioned folded back part 7 or folded returning part 8 is higher than the strength of cellular molded article in a mold pattern 5, the strength at the connected site of this insert member 13 with the above-mentioned folded back part 7 or the like will be more increased, which is also advantageous.

As the above-mentioned insert member 13, for example, a various shape of various material which includes metal, wood, FRP, thermo-plastic resin such as polyethylene, polypropylene or ABS, thermo-setting resin such as phenol resin or formaldehyde resin or the like can be mentioned among others. In a case that both of the above-mentioned surface skin material 3 and cellular molded article in a mold pattern 5 are composed of a polyolefine resin, insert member 13 is preferably also composed of a polyolefine resin. In such a case, as same as in the above-mentioned, the melt uniting strength of surface skin material 3 with cellular molded article in a mold pattern 5 is high, at the same time, the melt uniting strength of insert member 13 with surface skin material 3 and with cellular molded article in a mold pattern 5 is also high, and on top of them, a recycling of it can be more easy, which are advantages also.

As illustrated in FIG. 14 to FIG. 17, a method for producing a cellular molded article having a surface skin in a mold pattern 51 which relates to the embodiment of example 5 is, in the above-mentioned embodiment of example 2, before the above-mentioned vacuum forming (heat molding), cutting part 14 is set up at tip 6c of the above-mentioned mold pattern for folding back 6 in advance.

Figure 14:
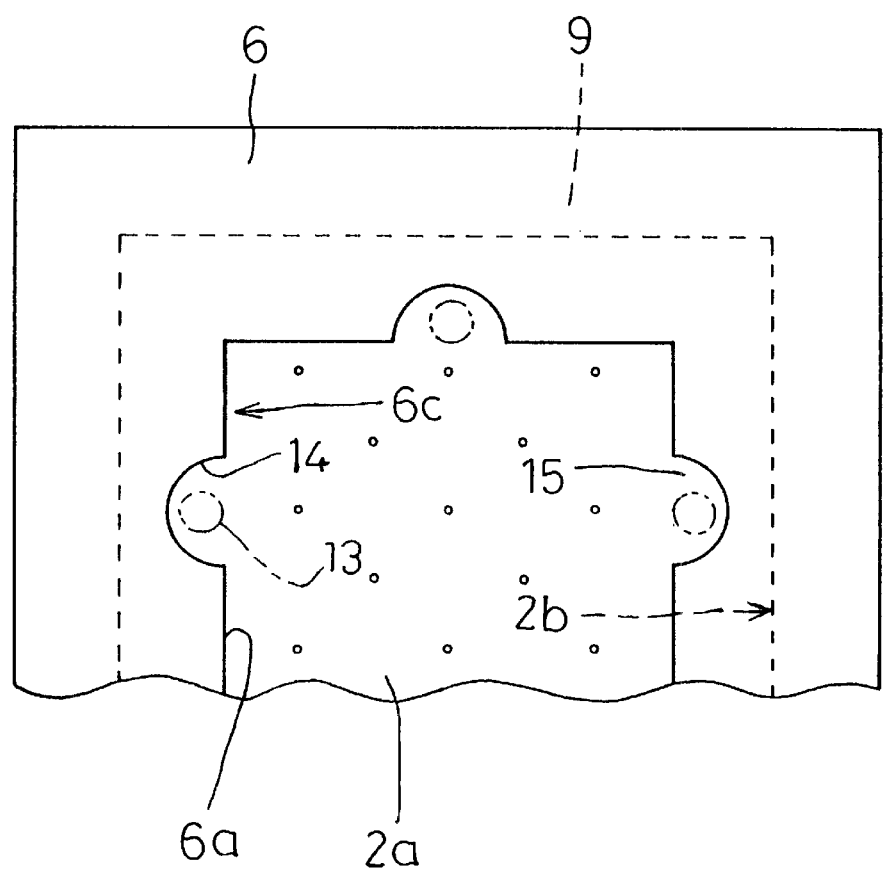
FIG. 14 is a plan view illustrating placement of a mold pattern for the folding back, in which a trimmed space for assembling an insert member at the tip is set up in a method for producing a cellular molded article having a surface skin in a mold pattern, which is relating to the embodiment of example 5.
Figure 15:
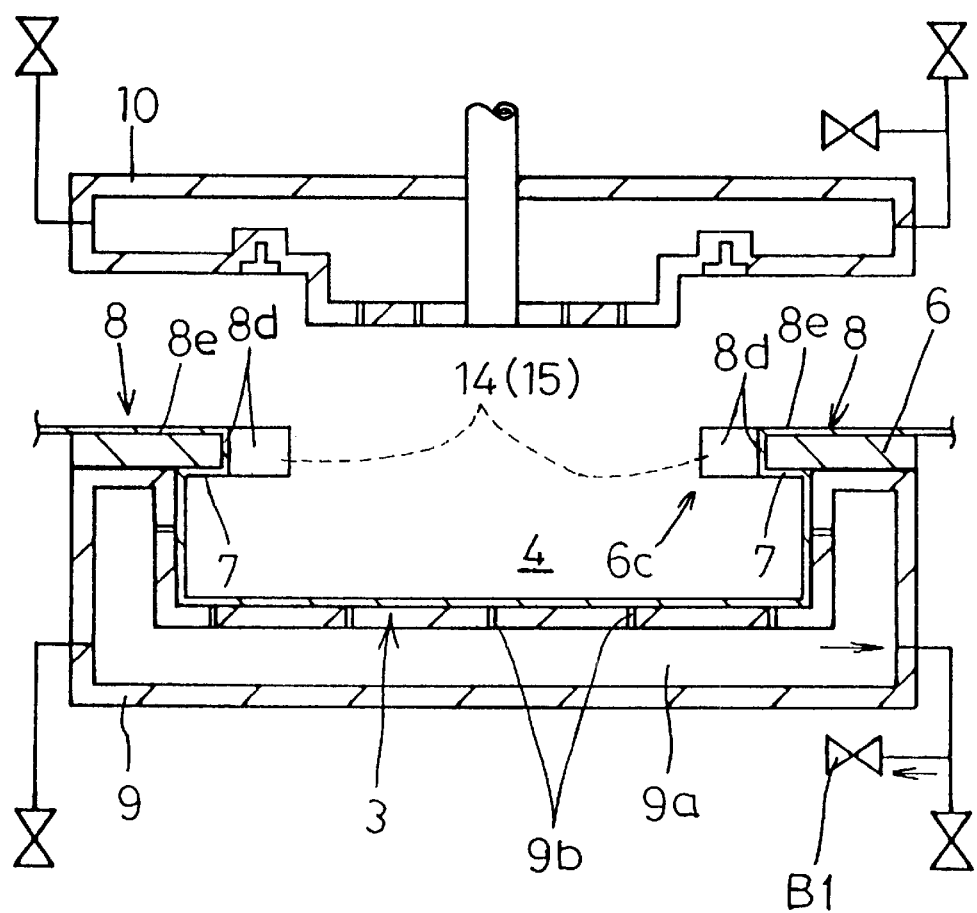
FIG. 15 is a cross-sectional drawing illustrating a state of vacuum formed surface skin material.

Namely, as illustrated in FIG. 14, in a case that, a cutting part for connecting insert member 14, which is, for example, shaped to a half circle figure in plan view at tip 6c of the above-mentioned mold pattern for folding back 6, is mounted in advance, as is illustrated in FIG. 15, when the above-mentioned vacuum forming, a space of prescribed range 15 is opened at inward direction of this cutting part for connecting insert member 14, and thus, the above-mentioned folded back part 7 and folded returning part 8 can be made to fold back and to fold return.

Figure 16:
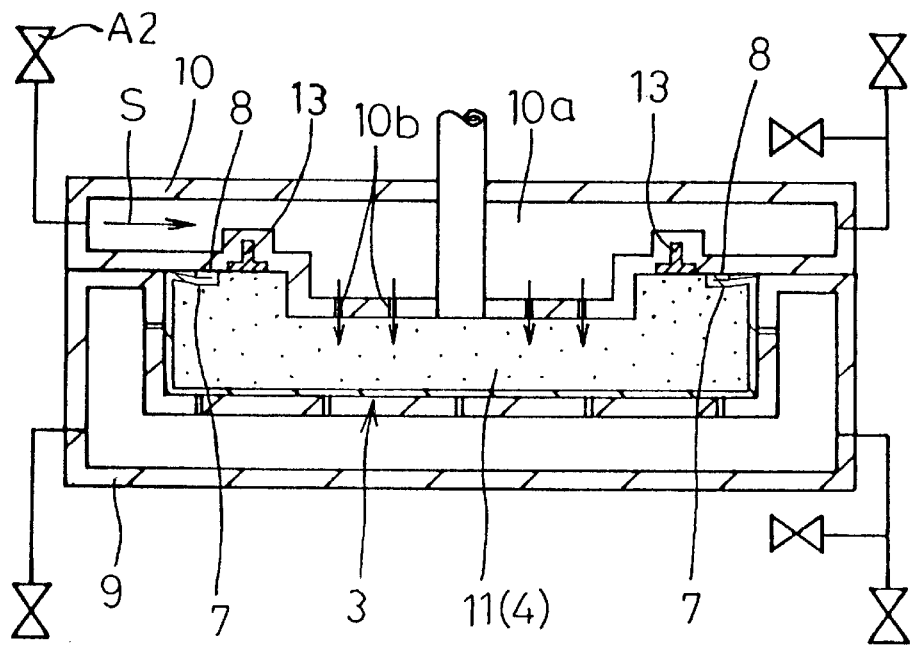
FIG. 16 is a cross-sectional drawing illustrating a state of uniting to one piece of an insert member with the back face of a cellular molded article in a mold pattern to be formed when an expansion molding is taken place.
Figure 17:
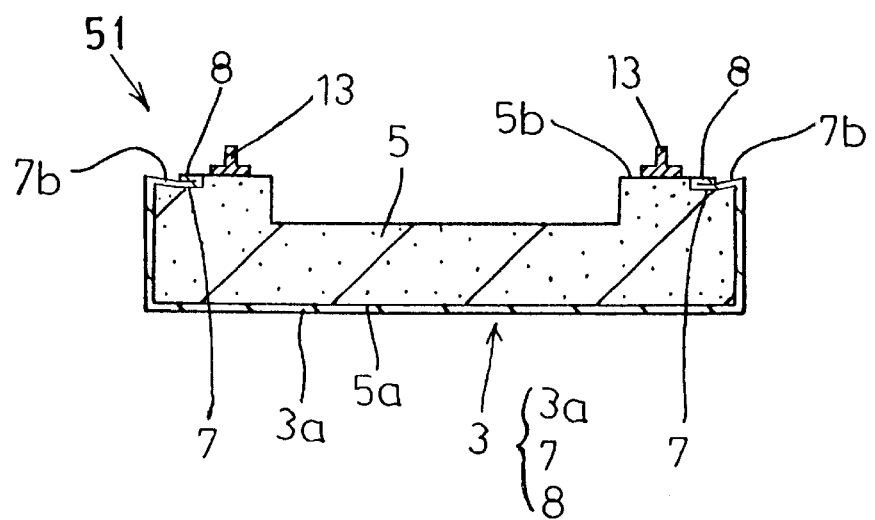
FIG. 17 is a cross-sectional drawing illustrating a state of a cellular molded article having a surface skin in a mold pattern being removed from the mold pattern.

Next, as illustrated in FIG. 16 and FIG. 17, when an expansion molding is done as same as in the above-mentioned, insert member 13 can be connected with back face 5b of cellular molded article in a mold pattern 5 through the above-mentioned space 15.

As in these, by means of setting up the above-mentioned cutting part for connecting insert member 14 in advance, since folded back part 7 or the like can be formed with having the above-mentioned space 15 at inward direction of this cutting part for connecting insert member 14, when insert member 13 is connected with back face 5b of cellular molded article in a mold pattern 5, the folding back or the like of surface skin material 3 can be done automatically so as to avert this insert member 13, and consequently, hand-works as in the conventional methods can be omitted, which is advantageous as well.

In further, in a case that cellular molded article having a surface skin in a mold pattern 51 in which folded back part 7 and folded returning part 8 are, as is in the above-mentioned, done to fold back and to fold return so as to avert insert member 13 which is melt united to one piece with back face 5b of the above-mentioned cellular molded article in the mold pattern 5, the above-mentioned insert member 13 can be melt united to one piece with back face 5b of cellular molded article in a mold pattern 5 so as to be buried, and as a result, the freedom of connecting method of insert member 13 can be widened, which is advantageous as well.

Furthermore, in a case that both of the above-mentioned surface skin material 3 and cellular molded article in a mold pattern 5 are composed of a polyolefine resin, as same as in the above-mentioned, insert member 13 preferably is composed of a polyolefine as well. In such case, melt uniting of surface skin material 3 with cellular molded article in a mold pattern 5 is harder, at the same time, the recycling of it can advantageously be made easy too.

In the above embodiments of example 1 to 5, although there have been describing of a case that female mold pattern 9 is to be the lower mold and male mold pattern 10 is to be the upper mold, the present invention is not limited to this. These may be positioned at upside down of the above, or these can be placed to move in horizontal direction for opening and clamping. In addition to this, an unevenness for a product designing pattern such as skin like embossing can be formed on cavity face 2a of the above-mentioned female mold pattern 9 in advance, if necessary.

As illustrated in FIG. 18 to FIG. 24, a method for producing a cellular molded article having a surface skin in a mold pattern 61 which relates to the embodiment of example 6 is that, on either one of these female pattern (metal mold) 9 and male pattern (metal mold) 10 which are composing mold pattern 2, for example, on the above-mentioned female pattern 9, after surface skin material 3 is placed on by a vacuum forming (heat molding) for example, by an expansion molding of expanded beads 11 filled into this mold pattern 4, expanded molded article in mold pattern 5 being formed and the above-mentioned surface skin material 3 are melt united to one piece.

And, this producing method is that, on exposure face 2a of the above-mentioned female pattern 9 forwarding inside of the above-mentioned mold pattern 4, that is, on a part which is composing cavity face 2a in this female pattern 9, by setting up electric heater (heater) 62, before the above-mentioned expansion molding, this cavity face 2a is pre-heated up to at a prescribed temperature, and at the same time, the above-mentioned expanded beads 11 are pre-heated up by steam S of which temperature is lower than the melt uniting temperature of said beads by themselves, and after steaming of said beads for a prescribed period with keeping this state, inside of the above-mentioned mold pattern is vacuumed and thus the condensate remaining there is evacuated.

Figure 18:
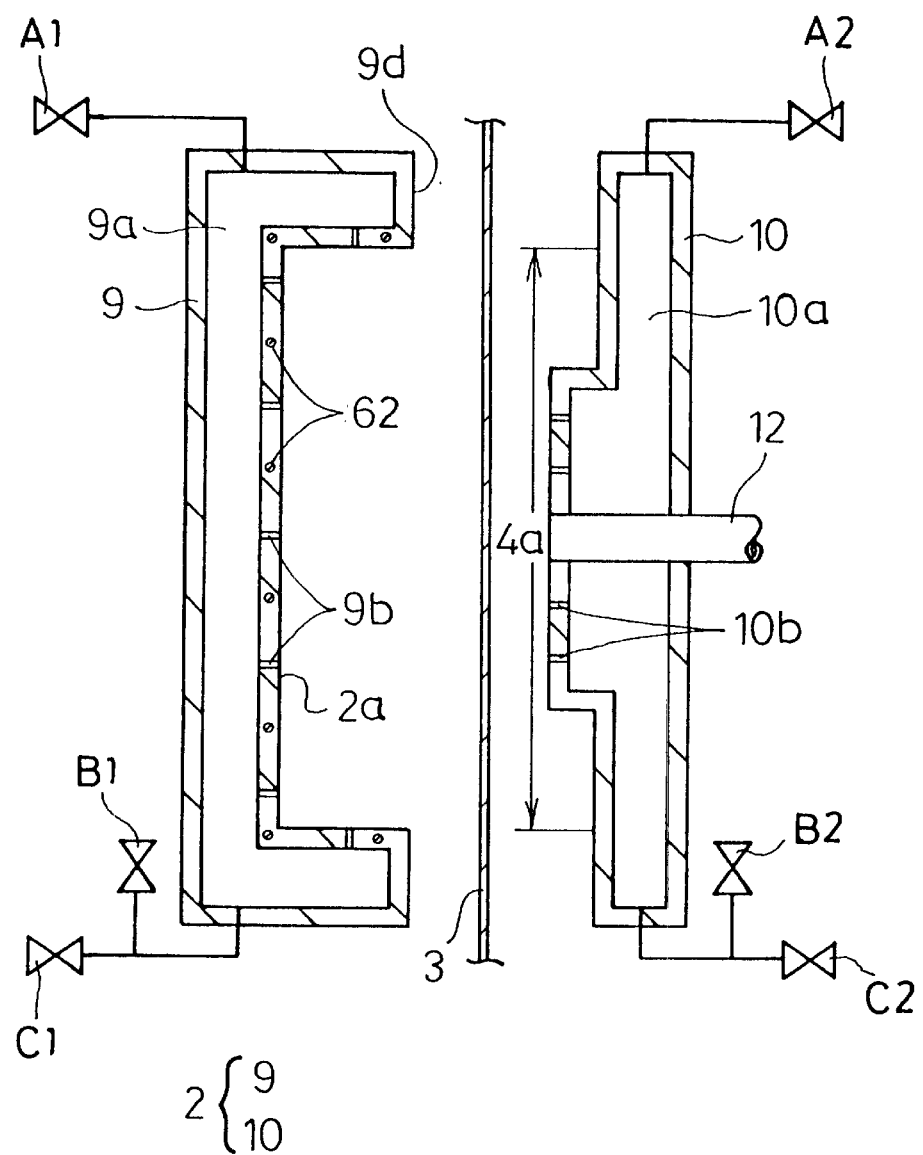
FIG. 18 is a cross-sectional drawing illustrating a state of a surface skin material being placed on a female mold pattern by a vacuum forming in a method for producing a cellular molded article having a surface skin in a mold pattern, which is relating to embodiment of example 6.
Figure 19:
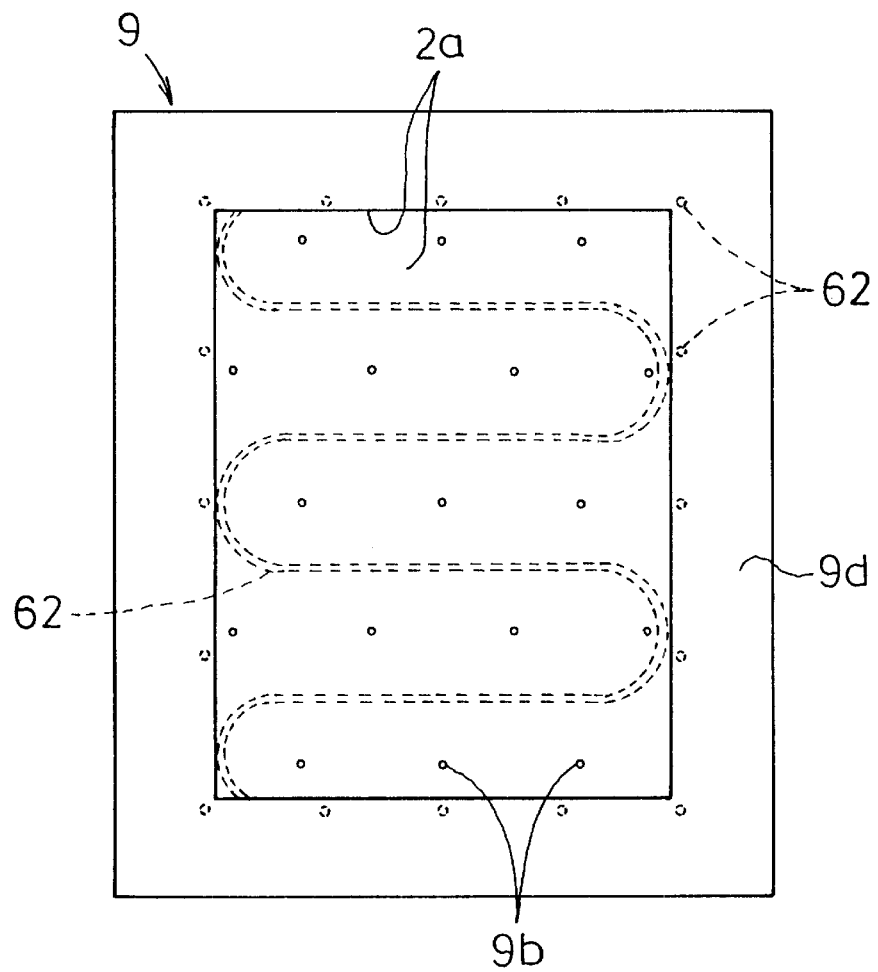
FIG. 19 is a plan view of a female mold pattern in FIG. 18.
Figure 20:
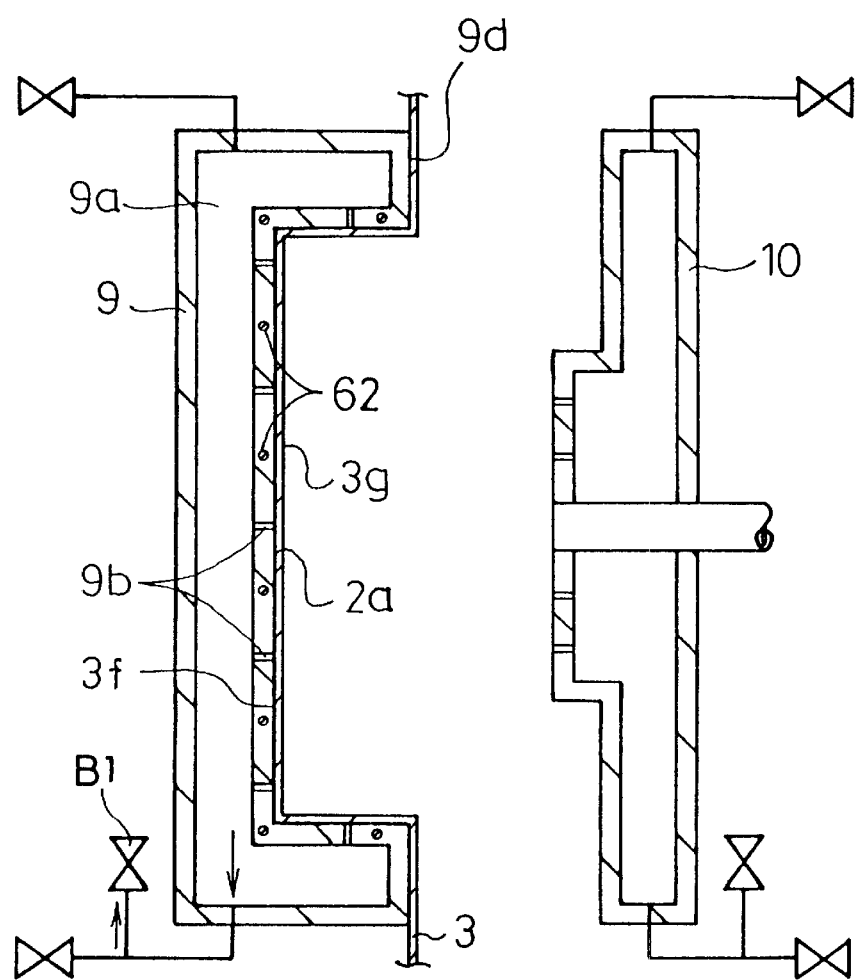
FIG. 20 is a cross-sectional drawing illustrating a state of vacuum-formed surface skin material in FIG. 18.

Namely, as illustrated in FIG. 18 to FIG. 20, at first, the above-mentioned surface skin material 3 is placed on by a vacuum forming, for example.

In this occasion, the above-mentioned mold pattern 2 is composed by female pattern 9 and male pattern 10 which are enabling to open and clamp in horizontal direction, for example, and are same as in the above-mentioned embodiments of example 1 to example 3.

The above-mentioned electric heater 62 is, as illustrated in FIG. 19 for example, buried in a part where composes cavity face 2a of the above-mentioned female pattern 9 in a state of meandering. In addition to these, a heat sensitizing measure for controlling temperature (heat thermocouple or the like, for example) which is not illustrated, a measure for controlling or the like (such as thermostat and a device for controlling electric current, for example) and such others are also placed on the above-mentioned female pattern 9 or on the other appropriate site, and, by these electric heater 62, the heat sensitizing measure, the controlling measure and the like, the above-mentioned cavity face 2a can be adjusted as a whole to at the approximately same temperature.

As the heater, it is not limited to electric heater 62 such as in the above-mentioned, and, for example, a heat medium heater of employing with heat-oil, steam, heated water or the like, or such other measures can be adopted. This heat medium heater is, for example, composed of a circulation piping in which the heated medium is circulating inside of it, or composed of such others. In further, when such heat medium heater is employed, a pump for feeding of said heat medium in pressurized condition, a heating measure for heating up said heat medium, a heat sensitizing measure, a refrigerator for cooling and such others may be placed on at appropriate sites.

While, the above-mentioned heater such as electric heater 62, the heat medium heater or the like may be buried, as is described in this embodiment, in a part where the above-mentioned cavity 2a is composed or in such others, or may be connected with a site located on the back side of this part or the like which is located on the inside of the above-mentioned chamber 9a. Furthermore, as a part for connecting this heater, it is not only limited to the above-mentioned cavity face 2a, but also it can be connected with, for example, the whole part which is composing surface 9d of female pattern 9 including this cavity face 2a, or with such others. The importance is that, by the above-mentioned heater, at least the above-mentioned cavity face 2a can be pre-heated up to at a prescribed temperature.

In order to place the above-mentioned surface skin material 3 on female pattern 9, a shaped-up surface skin material which will fit on the shape of surface 9d of this female pattern 9 in advance by a vacuum forming with using other mold pattern may be placed on, however, as is in this embodiment, in a case of placing it on by a heat molding such as by a vacuum forming, hand-works for pre-forming of it beforehand can advantageously be omitted.

In this stage, in order to make a vacuum forming as illustrated in FIG. 20, as same as in above-mentioned, after the above-mentioned surface skin material 3 is contacted with female pattern 9 in a softened state by heat in advance, valve B1 being connected to the above-mentioned chamber 9a may be opened or the like.

In this case, supposing that the above-mentioned cavity face 2a is pre-heated by the above-mentioned electric heater 62 or by such others to at a prescribed temperature, this softened surface skin material 3 which will contact tightly with this cavity face 2a can be minimized of its temperature lowering, and as a result, the heat molding such as a vacuum forming can effectively be done, which is also advantageous. And on top of that, in order to prevent a temperature lowering of surface skin material 3 during the heat molding process, even in this heat molding process, said heating by the heater may be continued, or may also be changed to by a multi-step heating measure which can change its set-up temperature from a prescribed original temperature during said heat molding process.

While, in a case of the above-mentioned surface skin material 3 being composed of a polyolefine resin, when the temperature of cavity face 2a before said heat molding is preferably set up in a range of at from 60 to 150° C., more preferably at from 60 to 130° C. and most preferably at from 70 to 120° C., since the above-mentioned surface skin material 3 can be heat-molded in an appropriate condition, the property of said product can advantageously be improved. In this stage, if the temperature of cavity face 2a is lower than 60° C., surface skin material 3 will not be appropriately softened, while if it is higher than 150° C., said surface skin material will be excessively softened. Therefore they are not preferable.

Figure 21:
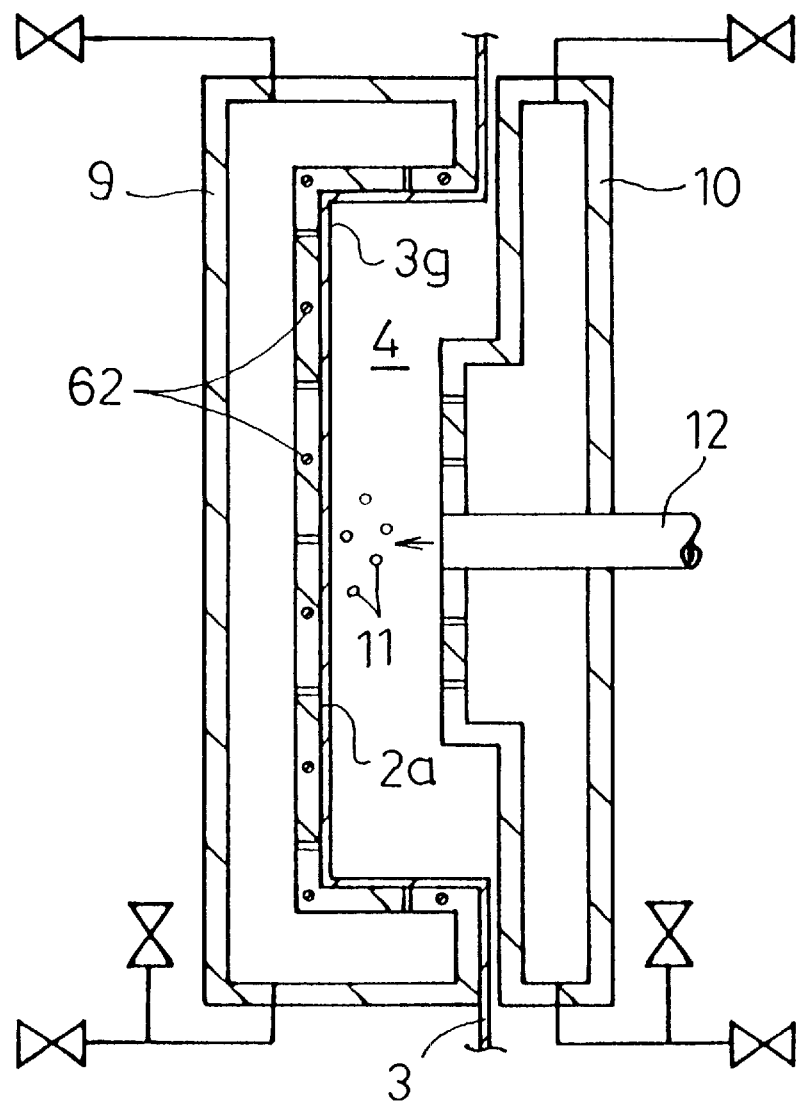
FIG. 21 is a cross-sectional drawing illustrating a state of the expanded beads being filled to inside of a mold pattern.

Next, as illustrated in FIG. 21, after said clamping being made, expanded beads 11 are filled into inside of mold pattern 4 from feeder 12. At this stage, as same as in above-mentioned, in order to ease evacuation of air residing in the above-mentioned mold pattern 4, as is described in this embodiment, said clamping can be made to be in a state of opening a little gap (cracking state). In further, in order to raise the adhesion property of cellular molded article in a mold pattern 5, which is obtained by an expansion molding in a mold pattern of said expanded beads 11, with the above-mentioned surface skin material 3, if necessary, coating of an adhesive may be done in advance on back face 3g of said surface skin material 3, which will come to contact with the above-mentioned expanded beads 11.

After filling of expanded beads 11, a preheating by feeding of steam S, of which temperature is lower than the temperature of melt uniting of expanded beads 11 by themselves, into inside of said mold pattern 4 through vapor holes 10b which are mounted in the above-mentioned male mold pattern 10 is done, and then, after the steaming of expanded beads 11 for a prescribed period with keeping this state, the condensate and moisture remaining there are suctioned and evacuated by using of a vacuum pump.

Figure 22:
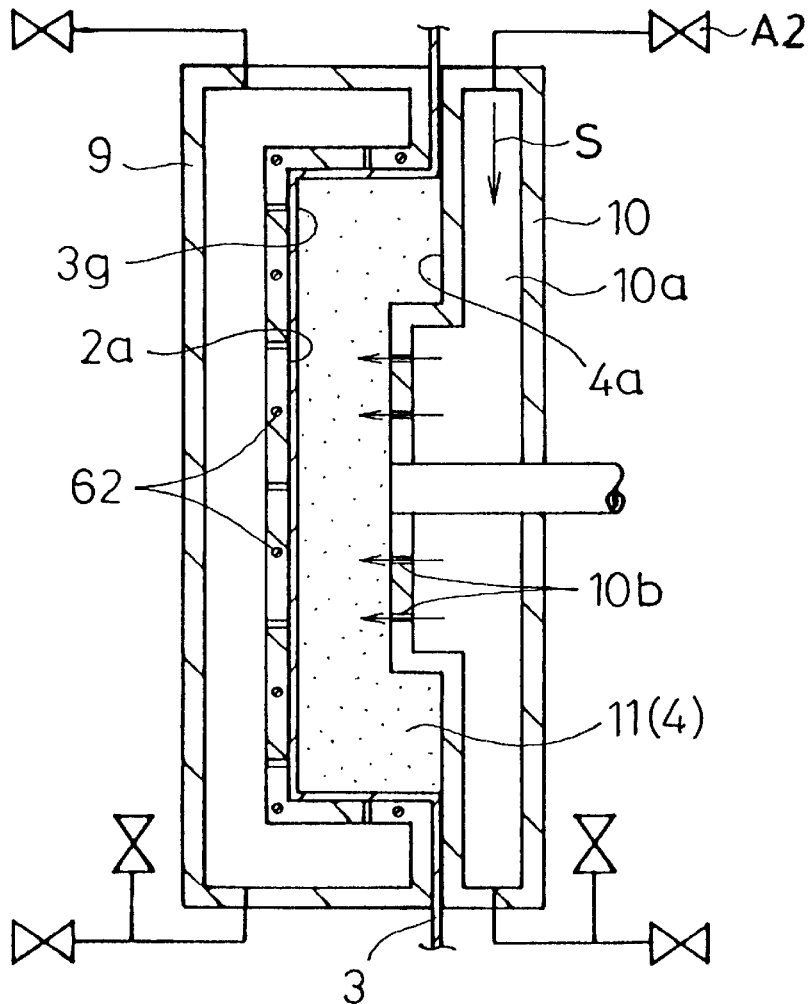
FIG. 22 is a cross-sectional drawing illustrating a state of expansion molding being taken place.

Subsequently, as illustrated in FIG. 22, after clamping the mold pattern in complete, vapor valve A2, which is connected to chamber 10a of the above-mentioned male pattern, is opened for feeding steam S into inside of mold pattern 4 from the above-mentioned vapor holes 10b so that the above-mentioned expanded beads 11 are made to be heat-expanded. At this stage, the above-mentioned cavity face 2a may be pre-heated by the above-mentioned electric heater 62 or the like before the heat expansion molding, however, in order to shorten said molding cycle, this preheating is preferably done in advance before the feeding of expanded beads 11.

As is described above, by means of preheating of the above-mentioned cavity face 2a by a heater, surface skin material 3 having been placed on said cavity face 2a is simultaneously pre-heated up to a prescribed temperature therewith. And as a result, the expansion molding, namely, melt uniting of surface skin material 3 with expanded beads 11, which will be expanded by the expansion molding in the mold pattern, can more effectively be done, which is advantageous as well. Furthermore, since heating only for the above-mentioned cavity face 2a can be done without heating of whole female pattern 9 as in the conventional method, the heat efficiency is also advantageously improved as well. Furthermore, since a moisture or water drops will not remain on said cavity face 2a even when preheating of the above-mentioned cavity face 2a is done, the surface appearance of surface skin material 3 can be made to improve, and at the same time, as is in this working embodiment, by means that surface skin material 3 is placed on female pattern 9 by a heat molding such as a vacuum forming, the elongation at a time of its heat molding can also be improved, which is also advantageous. In addition, there is an advantage of that, by means of the preheating of expanded beads 11 by steam, the steaming and the evacuation of condensate, an insufficient melt uniting within expanded beads 11 by themselves as well as between surface skin material 3 and expanded beads 11 will not happen, and at the same time, by the preheating of cavity face 2a by a heater, the evacuation of condensate can easily be done as well. Furthermore, in order to prevent a temperature lowering of the above-mentioned cavity face 2a during the expansion molding process, as same as is in the above-mentioned, the heating by a heater during the expansion molding process may be continued, or, the multi-step heating which can change its set-up temperature from original set-up temperature may be done as well.

On top of these, in a case that the above-mentioned surface skin material 3 and cellular molded article in a mold pattern 5 are composed of a polyolefine resin, the melt uniting of these surface skin material 3 and cellular molded article in a mold pattern 5 can be made harder, and at the same time, since said cellular molded article having a surface skin in a mold pattern 61 to be obtained is so-called all polyolefine, its recycling can easily be done, which is advantageous as well. In addition to these, if the above-mentioned cavity face 2a is prepared to be at in a range of 60 to 150° C. in advance, as same as in the above-mentioned, since surface skin material 3 which is placed on cavity face 2a will become to be in an appropriate softened state, the melt uniting of surface skin material 3 with expanded beads 11 can more effectively be done as well.

Figure 23:
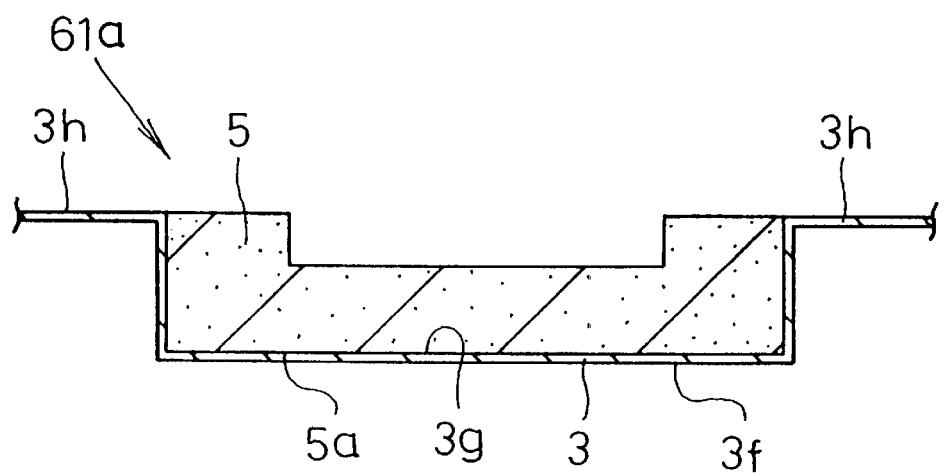
FIG. 23 is a cross-sectional drawing illustrating a cellular molded article having a surface skin in a mold pattern with an edge part.
Figure 24:
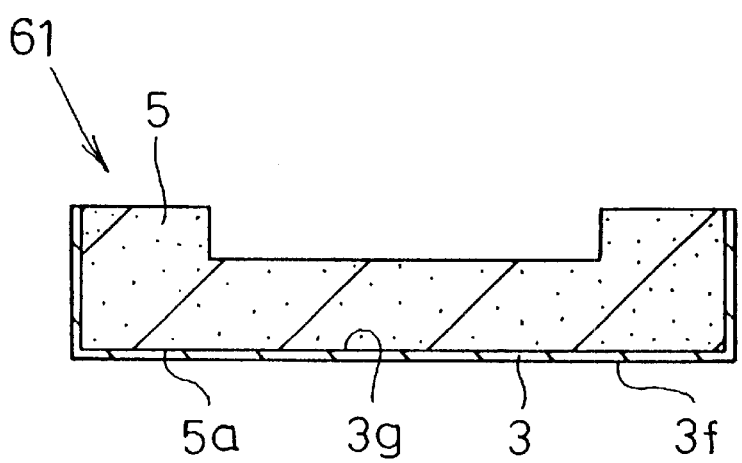
FIG. 24 is a cross-sectional drawing of a cellular molded article having a surface skin in a mold pattern after the edge part being trimmed off in FIG. 23.

Continuously, after the cooling according to its requirement, by opening the above-mentioned mold pattern 2 and by taking out from said mold pattern, as is illustrated in FIG. 23, cellular molded article having a surface skin 61a in a mold pattern, which is comprising cellular molded article in a mold pattern 5 having been obtained by the above-mentioned expansion molding in a mold pattern of expanded beads 11, and surface skin material 3 having edge part 3h, which has been melt united to one piece with surface 5a of said cellular molded article in a mold pattern 5, can be obtained. And, by trimming off of the above-mentioned edge part 3h, cellular molded article having a surface skin in a mold pattern 61 as illustrated in FIG. 24 can be obtained.

Figure 25:
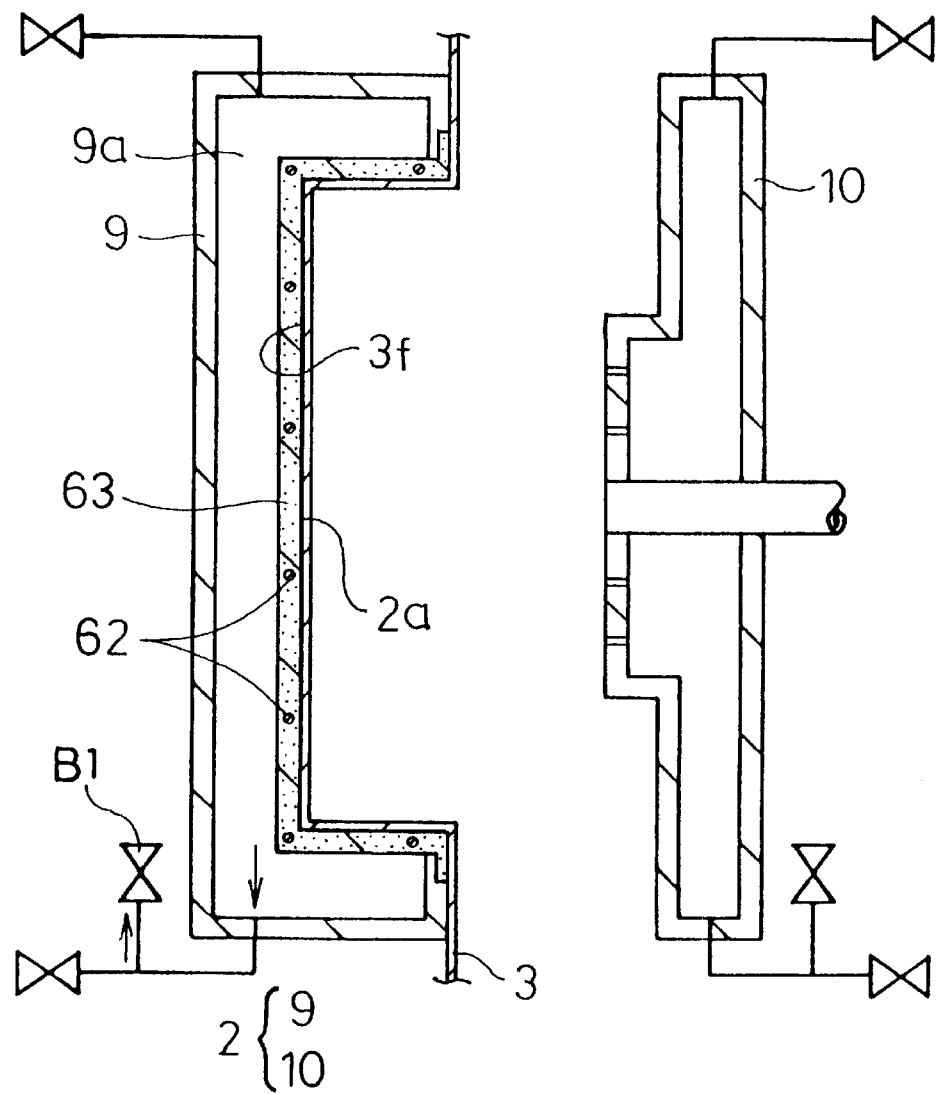
FIG. 25 is a cross-sectional drawing illustrating a state of vacuum-formed surface skin material in a method for producing a cellular molded article having a surface skin in a mold pattern, which is relating to the embodiment of example 7.
Figure 26:
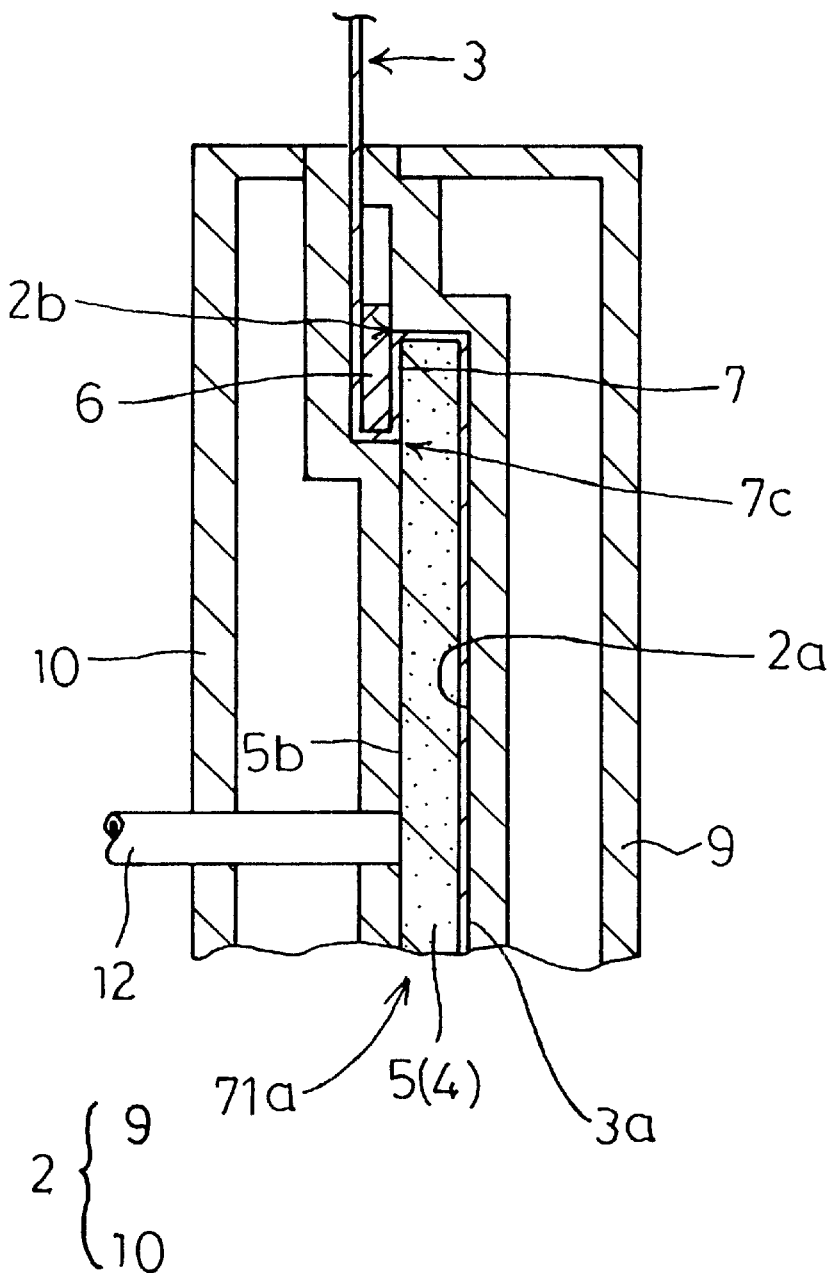
FIG. 26 is a cross-sectional drawing illustrating a conventional example.

As illustrated in FIG. 25, a method for producing a cellular molded article having a surface skin 61 in a mold pattern which relates to the embodiment of example 7 is that, in the above-mentioned embodiment of example 6, a part which is composing the above-mentioned cavity face 2a comprises of using gas permeable electric cast mold pattern 63 for example.

The above-mentioned gas permeable electric cast mold pattern 63 has minute gas permeable holes, which are connected with the above-mentioned chamber 9a, on the whole or on a prescribed portion of cavity face 2a. And such mold pattern may be produced by a nickel electric cast or the like, for example, (e.g. POROUS DENCHU; trade name, made by KONAN TOKUSYU SANGYO Co., Ltd.).

Thus, since the above-mentioned gas permeable electric cast mold 63 has minute gas permeable holes on whole cavity face 2a or on a prescribed portion of it, as is in the above-mentioned, when the above-mentioned surface skin material 3 is placed on by a vacuum forming, the evacuation of air or gas residing between this gas permeable electric cast mold 63 and surface skin material 3 can more effectively be done. By this reason, the above-mentioned surface skin material 3 can more surely be contacted with cavity face 2a, and at the same time, since the diameter of the above-mentioned gas permeable holes is so small to be in a range about from some tens to some hundreds u m, an advantage is also that the mark of these gas permeable holes will not be printed on surface 3f of the above-mentioned surface skin material 3.

And in place of the above-mentioned gas permeable electric cast mold 63, a gas permeable metal mold or a gas permeable ceramic mold (e.g. Porcerax II; trade name, made by SINTOKOGYO,LTD.) having minute gas permeable holes of about some μm of the diameter on whole cavity face 2a by a sintering metal or ceramic particles under a prescribed condition can be used. Alternatively, a gas permeable metal mold or a gas permeable ceramic mold having minute gas permeable holes of the diameter of not more than 0.4 mm or so, preferably not more than 0.2 mm which are mechanically made by drill or the like can be used.

As is described above, in the embodiments of example 6 and example 7, there has been described of a case that one of metal mold patterns on which the above-mentioned surface skin material 3 being placed is female pattern 9, however the present invention is not limited to this case, a case that the above mentioned one of metal mold patterns 10 is male pattern and the other metal mold pattern is female pattern 9 can be adopted as well. In this case, the above-mentioned heater such as electric heater 62, as is illustrated in FIG. 18, can be connected with a part of the above-mentioned male pattern 10 which composes at least of exposure face 4a toward inside of the above-mentioned mold pattern 4.

And, the above mentioned mold pattern 2 can, besides with a horizontal motion, also be opened and clamped with a vertical motion as described in the embodiments of example 1 to example 5, or the above-mentioned folded back part 7, folded returning part 8 and the like can be formed by using above-mentioned mold pattern for folding back 6.

In further, on surface 3f of the above-mentioned surface skin material 3, an unevenness for a product design pattern such as skin-like embossing may be formed in advance, however, when this embossing is formed on exposure face 2a (4a) toward inside of the mold pattern of the above-mentioned one of metal mold patterns in advance, at a time of placing surface skin material 3 on one of metal mold patterns by a heat molding such as the above-mentioned vacuum forming, since the above-mentioned unevenness for the product design pattern can be printed on surface 3f of said surface skin material 3, the hand-works for these can advantageously be omitted. Additionally, said unevenness for the product design pattern can be formed by using a various conventional method such as etching or printing from the other mold pattern.

Next, the present invention will be further illustrated by the following examples, however, scope of the invention is not limited to these examples.

EXAMPLE 1 to 5

In a condition of both female mold pattern part and male mold pattern part which are composing of a mold pattern, after placement of a surface skin material on the above-mentioned female mold pattern by a vacuum forming, an expansion molding was carried out within this mold pattern. In inside part of the female pattern part which is composing a cavity face of the above-mentioned female pattern, a piping for streaming of a heating medium is formed in a state of meandering, and by streaming of a steam into this stream pipe, the cavity face was kept at a temperature as shown in Table 1. And, to the above-mentioned male pattern, vapor holes for feeding the steam into inside of the mold pattern and a feeder for filling expanded beads were mounted on.

In this stage, a polyolefine thermoplastic resin sheet (TPO sheet) was employed as the above-mentioned surface skin material, and then, after heat softening of this, it was placed on the above-mentioned female mold pattern and formed by a vacuum pumping. EPERAN-PP (trade name, made by KANEKA CORPORATION, expansion ratio was 15 times, imparted with 2 kg/cm$^2$ of inner pressure in advance by using an air pressure in an autoclave) as the expanded beads were used, and after the clamping, said expanded beads were charged into inside of said mold pattern through the above-mentioned feeder.

After the filling of said expanded beads, a preheating was carried out by feeding a steam (vapor pressure, 1.5 Kg/cm$^2$·G) into inside of said mold pattern through the above-mentioned vapor holes being formed in said male mold pattern. Then, after the steaming of these expanded beads, the condensate and steam residing there were evacuated by suctioning. And, after being heated up by feeding a steam (vapor pressure, 3.2~3.7 Kg/cm$^2$·G) again through the above-mentioned vapor holes, cooled by water, and a cellular molded article having a surface skin in the mold pattern was harvested. And, cooling of the female mold pattern at a time of the above-mentioned water cooling was carried out by streaming of a cooled water into the above mentioned stream piping.

COMPARATIVE EXAMPLE 1 to 3

A cellular molded article having a surface skin in the mold pattern was harvested as same as in example 1 to 5 except that cavity face of said female mold pattern was kept at a temperature shown in Table 1 by feeding of a steam into inside of the chamber of the female mold pattern which was not formed of the above-mentioned stream piping.

And in the above-mentioned example 1 to 5 and comparative example 1 to 3, at just before the vacuum forming of said surface skin material, presence or non-presence of water wetting on cavity face of said female mold pattern was observed. And also, by observation of said cellular molded article having the surface skin in the mold pattern which had been harvested, each of them was evaluated according to an evaluation standard shown below. The results are shown in Table 1.

EVALUATION STANDARD

⊚: the product design pattern of the metal mold was clearly printed on.

◯: the product design pattern of the metal mold was almost printed on.

Δ: although the product design pattern was printed on, lacking part was observed.

×: the product design pattern was not printed on in complete.

TABLE 1

| | temperature of cavity face of female mold pattern (° C.) | | | |
|---|---|---|---|---|
| | at vacuum forming of surface skin material | at expansion molding | water wet on cavity face of female mold pattern | Evaluation result of surface property |
| Ex-1 | 60 | 60 | no | ○ |
| Ex-2 | 80 | 80 | no | ⊙ |
| Ex-3 | 110 | 110 | no | ⊙ |
| Ex-4 | 80 | 110 | no | ⊙ |
| Ex-5 | 110 | 80 | no | ⊙ |
| C-Ex-1 | 50 | 50 | yes | X |
| C-Ex-2 | 80 | 80 | yes | Δ~X |
| C-Ex-3 | 110 | 110 | yes | Δ |

POSSIBILITY FOR INDUSTRIAL USE

As described in the above, a method for producing a cellular molded article having a surface skin in a mold pattern and a molded article thereof which relate to the present invention are useful as an automobile interior trim material or the like and as a method for producing it, and particularly, it is appropriately useful in a case of producing an automobile interior trim material having advantages of, (1) the folded back part, which is folded back toward back side a cellular molded article in a mold pattern and is melt united to one piece therewith, is hardly peeled out, (2) even in a case of assembling the insert member, hand-works for it will be lessened, (3) the expansion molding or the heat molding of the surface skin material can more effectively be done, (4) the surface appearance of the surface skin material or the elongation property at a heat molding can be improved, (5) a good heat efficiency at the preheating of metal mold on which an surface skin material will be placed, or the like.

What is claimed is:

1. A method for producing a cellular molded article having a surface skin in a mold pattern, in which the above-mentioned surface skin material is melt united to one piece with a surface of the cellular molded article in the mold pattern which is molded by an expansion molding of expanded beads within this mold pattern, after the surface skin material is heat-molded along a cavity face of the mold pattern, wherein the method is characterized in that at a time of the above-mentioned heat-molding, an outer edge part of the above-mentioned surface skin material is folded back toward an inside direction of the mold pattern and forms a folded back part along a pattern for folding back which is arranged from an opening edge of the above-mentioned cavity face to project toward the inside direction of the mold pattern, and then, the above-mentioned pattern for folding back is removed, thereafter, at a time of the above-mentioned expansion molding, the one face of the above-mentioned folded back part is melt united to one piece with a back face of the cellular molded article in the mold pattern as well as a folded returning part, which is in a state that an outer edge part of the surface skin material is folded back toward an outside direction of the mold pattern from a tip of this folded back part, is pressed so as to pile on the other face of the above-mentioned folded back part.

2. A method for producing a cellular molded article having a surface skin in a mold pattern as defined in claim 1, wherein at a time of the heat-molding, the above-mentioned folded returning part is pre-formed to a state in which it is folded back to the outside direction of the mold pattern in a manner to be rolling up the pattern for folding back from the tip of the above-mentioned folded back part.

3. A method for producing a cellular molded article having a surface skin in a mold pattern as defined in claim 1 or 2, wherein the outer part of the above-mentioned surface skin material is trimmed off so that the folded returning part is shorter than the above-mentioned folded back part.

4. A method for producing a cellular molded article having a surface skin in a mold pattern as defined in claim 1, wherein an angle between the cavity face and the pattern for folding back at the above-mentioned opening edge is set up larger than an angle between the back face and an edge of the surface of the above-mentioned cellular molded article in the mold pattern.

5. A method for producing a cellular molded article having a surface skin in a mold pattern as defined in claim 1, wherein at a time of the above-mentioned expansion molding, an insert member is connected with at least either one of the folded back part or the folded returning part.

6. A method for producing a cellular molded article having a surface skin in a mold pattern as defined in claim 1, wherein before the above-mentioned heat molding is done, a cut off part for setting up an insert member at the tip of the above-mentioned pattern for folding back is prepared.

7. A method for producing a cellular molded article in a mold pattern having a surface skin as defined in claim 2, wherein an angle between the cavity face and the pattern for folding back at the above-mentioned opening edge is set up larger than an angle between the back face and an edge of the surface of the above-mentioned cellular molded article in the mold pattern.

8. A method for producing a cellular molded article in a mold pattern having a surface skin as defined in claim 3, wherein an angle between the cavity face and the pattern for folding back at the above -mentioned opening edge is set up larger than an angle between the back face and an edge of the surface of the above-mentioned cellular molded article in the mold pattern.

9. A method for producing a cellular molded article in a mold pattern having a surface skin as defined in claim 2, wherein at a time of the above-mentioned expansion molding, an insert member is connected with at least either one of the folded back part or the folded returning part.

10. A method for producing a cellular molded article in a mold pattern having a surface skin as defined in claim 3, wherein at a time of the above-mentioned expansion molding, an insert member is connected with at least either one of the folded back part or the folded returning part.

11. A method for producing a cellular molded article in a mold pattern having a surface skin as defined in claim 4, wherein at a time of the above-mentioned expansion molding, an insert member is connected with at least either one of folded back part or the folded returning part.

12. A method for producing a cellular molded article in a mold pattern having a surface skin as defined in claim 2, wherein before the above-mentioned heat molding is done, a cut off part for setting up an insert member at the tip of the above-mentioned pattern for folding back is prepared.

13. A method for producing a cellular molded article in a mold pattern having a surface skin as defined in claim 3, wherein before the above-mentioned heat molding is done, a cut off part for setting up the insert member at the tip of the above-mentioned pattern for folding back is prepared.

14. A method for a producing cellular molded article in a mold pattern having a surface skin as defined in claim 4, wherein before the above-mentioned heat molding is done, a cut off part for setting up an insert member at the tip of the above-mentioned pattern for folding back is prepared.

15. A cellular molded article having a surface skin in a mold pattern, comprising the cellular molded article in the mold pattern and the surface skin material which comprises a surface part which is melt united to one piece with the surface of the said cellular molded article in the mold pattern, a folded back part in which an edge part of said surface part is folded back toward an inside direction of the above-mentioned cellular molded article in the mold pattern and of which one face is melt united to one piece with a back face of the above-mentioned cellular molded article in the mold pattern, and a folded returning part which is folded returning from a tip of said folded back part toward an outside direction of the above-mentioned cellular molded article in the mold pattern so as to pile on the other face of this folded back part and at the same time so as to be shorter than the above-mentioned folded back part.

16. A cellular molded article having a surface skin in a mold pattern as defined in claim 15, wherein the above-mentioned folded returning part is melt united to one piece with the other face of the folded back part.

17. A cellular molded article having a surface skin in a mold pattern as defined in claim 15 or 16, wherein an insert member is united with at least either the above-mentioned folded back part or folded returning part.

18. A cellular molded article having a surface skin in a mold pattern as defined in claim 15 or 16, wherein the above-mentioned folded back part and folded returning part are folded back and folded returning in a manner to avert an insert member which is melt united to one piece with the back face of the above-mentioned cellular molded article in the mold pattern.

19. A cellular molded article having a surface skin in a mold pattern as defined in claim 15 or 16, wherein the above-mentioned surface skin material and cellular molded article in the mold pattern consist of a polyolefine line resin.

20. A cellular molded article having a surface skin in a mold pattern as defined in claim 17, wherein the above-mentioned surface skin material, cellular molded article in the mold pattern and the insert member consist of a polyolefine line resin.

21. A cellular molded article in a mold pattern having a surface skin as defined in claim 18, wherein the above-mentioned surface skin material, expanded molded article in the mold pattern and the insert member consist of a polyolefine resin.

22. A method for producing a cellular molded article having a surface skin in a mold pattern, wherein the cellular molded article in the mold pattern to be formed and the above-mentioned surface skin material are melt united to one piece by an expansion molding with filling of expanded beads into this mold pattern after the surface skin material is placed on either one of the two metal mold parts which are composing the mold pattern, wherein a heater to enable an exposure face which is exposed inside the above-mentioned mold pattern in the above-mentioned one metal mold part to be maintained at a prescribed temperature is assembled under at least the above-mentioned exposure face part, and by this method, the above-mentioned exposure face is pre- heated at a prescribed temperature, and at the same time, the above-mentioned expanded beads are pre-heated by steam having a temperature that is lower than the melt uniting temperature of said beads by themselves, and after steaming of said beads for a prescribed period, the inside of the above-mentioned mold pattern is vacuumed and thus condensate formed of the above-mentioned steam is evacuated before the above-mentioned expansion molding.

23. A method for producing a cellular molded article having a surface skin in a mold pattern as defined in claim 22, wherein the above-mentioned surface skin material and cellular molded article consist of a polyolefine line resin.

24. A method for, producing a cellular molded article having a surface skin in a mold pattern as defined in claim 23, wherein the temperature of the exposure face before the above-mentioned expansion molding is set up in a range from 60 to 150° C.

25. A method for producing a cellular molded article having a surface skin in a mold pattern as defined in any one of claim 22 to 24 wherein the above-mentioned surface skin material is placed on one of the above-mentioned metal mold parts by a heat-molding.

26. A method for producing a cellular molded article having a surface skin in a mold pattern as defined in claim 25, wherein the above-mentioned exposure face is pre- heated up to a prescribed temperature before the above-mentioned heat-molding.

27. A method for producing a cellular molded article having a surface skin in a mold pattern as defined in claim 26, wherein the above-mentioned temperature of the exposure face before the above-mentioned heat-molding is set up in a range from 60 to 150° C.

28. A method for producing a cellular molded article having a surface skin in a mold pattern as defined in claim 25, wherein at least a part which includes the above-mentioned exposure face consists of a gas permeable electric cast mold, a gas permeable metal mold or a gas permeable ceramic mold.

29. A method for producing a cellular molded article having a surface skin in a mold pattern as defined in claim 25, wherein an unevenness for a product design pattern is pre-formed on the above-mentioned exposure face.

30. A method for producing a cellular molded article in a mold pattern having a surface skin as defined in claim 26, wherein at least a part which includes the above-mentioned exposure face consists of a gas permeable electric cast mold, a gas permeable metal mold or a gas permeable ceramic mold.

31. A method for producing a cellular molded article in a mold pattern having a surface skin as defined in claim 27, wherein at least a part which includes the above-mentioned exposure face consists of a gas permeable electric cast mold, a gas permeable metal mold or a gas permeable ceramic mold.

32. A method for producing a cellular molded article in a mold pattern having a surface skin as defined in claim 26, wherein an unevenness for a product designed pattern is pre-formed on the above-mentioned exposure face.

33. A method for producing a cellular molded article in a mold pattern having a surface skin as defined in claim 27, wherein an unevenness for a product designed pattern is pre-formed on the above-mentioned exposure face.

34. A method for producing a cellular molded article in a mold pattern having a surface skin as defined in claim 28, wherein an unevenness for a product designed pattern is pre-formed on the above-mentioned exposure face.

* * * * *